(12) United States Patent
Anguera et al.

(10) Patent No.: US 12,771,012 B2
(45) Date of Patent: Oct. 20, 2026

(54) MODULAR MULTI-STAGE ANTENNA SYSTEM AND COMPONENT FOR WIRELESS COMMUNICATIONS

(71) Applicant: IGNION, S.L., Barcelona (ES)

(72) Inventors: Jaume Anguera, Vinaròs (ES); Aurora Andujar, Barcelona (ES); Carles Puente, Barcelona (ES); Rosa E. Mateos Navarro, Barcelona (ES)

(73) Assignee: IGNION, S.L., Barcelona (ES)

( * ) Notice: Subject to any disclaimer, the term of this patent is extended or adjusted under 35 U.S.C. 154(b) by 42 days.

(21) Appl. No.: 18/825,439

(22) Filed: Sep. 5, 2024

(65) Prior Publication Data

US 2025/0070455 A1 Feb. 27, 2025

Related U.S. Application Data

(63) Continuation of application No. 18/490,104, filed on Oct. 19, 2023, now abandoned, which is a (Continued)

(30) Foreign Application Priority Data

Feb. 26, 2018 (EP) .................................... 18158695

(51) Int. Cl.
*H01Q 1/24* (2006.01)
*H01Q 1/38* (2006.01)
(Continued)

(52) U.S. Cl.
CPC ............... *H01Q 1/243* (2013.01); *H01Q 1/38* (2013.01); *H01Q 1/48* (2013.01); *H01Q 5/335* (2015.01); *H01Q 21/0025* (2013.01)

(58) Field of Classification Search
CPC ............ H01Q 1/243; H01Q 1/38; H01Q 1/48; H01Q 5/335; H01Q 21/0025; H01Q 5/321; H01Q 5/378; H01Q 9/40; H01Q 21/28
See application file for complete search history.

(56) References Cited

U.S. PATENT DOCUMENTS 5,504,494 A 4/1996 Chatzipetros et al.
6,664,930 B2 12/2003 Wen et al.
(Continued)

FOREIGN PATENT DOCUMENTS

EP 3073568 A1 9/2016
WO 2016012507 A1 1/2016

OTHER PUBLICATIONS

Wong , K. L., Compact and broadband microstrip antennas, John Wiley and Sons Inc, Jan. 1, 2002, pp. 13, 210.
(Continued)

*Primary Examiner* — David E Lotter
(74) *Attorney, Agent, or Firm* — Edell, Shapiro & Finnan, LLC

(57) ABSTRACT

A wireless device comprises a radiating system that comprises: an antenna system, a ground plane, and a matching network. The antenna system comprises an antenna component including a first multi-section antenna component comprising two sections, each comprising a conductive element. The matching network connected to the antenna system for impedance matching to a first frequency range. The radiating system operates in a frequency range of operation including the first frequency range, the first frequency range comprising a first highest frequency and a first lowest frequency. The first antenna component has a maximum size larger than 1/30 times and smaller than 1/5 times a free-space wavelength corresponding to the lowest frequency of operation. The
(Continued)

conductive elements in the different sections of the first antenna component are spaced apart from each other.

20 Claims, 21 Drawing Sheets

Related U.S. Application Data continuation of application No. 17/947,470, filed on Sep. 19, 2022, now abandoned, which is a continuation of application No. 16/731,755, filed on Dec. 31, 2019, now Pat. No. 11,482,772, which is a continuation of application No. PCT/EP2018/068436, filed on Jul. 6, 2018.

(60) Provisional application No. 62/634,943, filed on Feb. 26, 2018, provisional application No. 62/529,032, filed on Jul. 6, 2017.

(51) Int. Cl.

| | |
|---|---|
| ***H01Q 1/48*** | (2006.01) |
| ***H01Q 5/335*** | (2015.01) |
| ***H01Q 21/00*** | (2006.01) |

(56) References Cited

U.S. PATENT DOCUMENTS

| | | | | |
|---|---|---|---|---|
| 7,274,340 | B2 | 9/2007 | Ozden et al. | |
| 7,511,675 | B2 | 3/2009 | Puente-Baliarda et al. | |
| 7,876,274 | B2 | 1/2011 | Hobson et al. | |
| 8,549,289 | B2 | 10/2013 | Montgomery et al. | |
| 9,130,259 | B2 | 9/2015 | Anguera et al. | |
| 9,130,267 | B2 | 9/2015 | Anguera et al. | |
| 9,331,389 | B2 | 5/2016 | Anguera Pros et al. | |
| 2008/0303729 | A1 | 12/2008 | Milosavljevic et al. | |
| 2009/0051597 | A1 | 2/2009 | Wen et al. | |
| 2013/0249753 | A1 | 9/2013 | Asanuma et al. | |
| 2013/0257674 | A1 | 10/2013 | Li et al. | |
| 2014/0015730 | A1 | 1/2014 | Anguera Pros et al. | |
| 2016/0028152 | A1 | 1/2016 | Anguera Pros et al. | |
| 2016/0111790 | A1 | 4/2016 | Anguera Pros et al. | |
| 2016/0285166 | A1 | 9/2016 | Andujar Linares et al. | |
| 2017/0202058 | A1 | 7/2017 | Anguera Pros et al. | |
| 2017/0358848 | A1 | 12/2017 | Andujar Linares et al. | |
| 2020/0176855 | A1* | 6/2020 | Anguera | H01Q 5/378 |
| 2023/0019864 | A1* | 1/2023 | Anguera | H01Q 5/321 |
| 2024/0120644 | A1* | 4/2024 | Anguera | H01Q 5/321 |

OTHER PUBLICATIONS

Huynh , M. C., A numerical and experimental investigation of planar inverted-F antennas for wireless communication Applications, Virginia Polytechnic Institute and State University, Oct. 19, 2000, pp. 43, 47.

Gobien , A. T., Investigation of low profile antenna designs for use in hand-held radios—Master of Science, Virginia Polytechnic Institute and State University, Aug. 1, 2007, pp. 174, 176, 191.

* cited by examiner

Z1: LQW18AN2N2D10
Z2: LQW18AN7N2G80
Z3: GJM1555C1H1R8WB01
Z4: GJM1555C1HR50WB01
Z5: LQW15AN7N8G80
Z6: GJM1555C1H1R1WB01
Z7: LQW18AN12NG10
Z8: GJM1555C1H1R9WB01

ZBetween sections: LQW18AN18NG80

Z1: GJM1555C1H1R4WB01
Z2: LQW15AN8N4G80
Z3: LQW15AN7N8G80
Z4: GJM1555C1H1R6WB01
Z5: LQW18AN9N9C80
Z6: GJM1555C1H1R1WB01
Z7: LQW18AN11NG80
Z8: GJM1555C1H2R5WB01

Z1: GJM1555C1H3R7WB01
Z2: LQW18AN17NG80
Z3: LQW18AN11NG80
Z4: LQW18AN15NJ10
Z5: LQW15AN5N6B80

ZBetween sections (notch filter):
Z9: GJM1555C1H3R2WB01
Z10: LQW15AN4N0G80

MODULAR MULTI-STAGE ANTENNA SYSTEM AND COMPONENT FOR WIRELESS COMMUNICATIONS

CROSS REFERENCE TO RELATED APPLICATIONS

This application is a continuation of U.S. patent application Ser. No. 18/490,104 filed Oct. 19, 2023, which is a continuation of U.S. patent application Ser. No. 17/947,470 filed Sep. 19, 2022, now abandoned, which is a continuation of U.S. patent application Ser. No. 16/731,755 filed Dec. 31, 2019, now U.S. Pat. No. 11,482,772, which is a continuation of International Application No. PCT/EP2018/068436, filed on Jul. 6, 2018, which claims priority under 35 U.S.C. § 119 to European Application No. EP 18158695.9 filed on Feb. 26, 2018, and which claims the benefit of U.S. Provisional Application No. 62/634,943, filed on Feb. 26, 2018, and U.S. Provisional Application No. 62/529,032, filed on Jul. 6, 2017, the entire contents of which are hereby incorporated by reference.

TECHNICAL FIELD

The present invention relates to the field of wireless portable devices, and more specifically to multiband and/or multifunctional wireless devices, normally requiring operation at different communication standards.

BACKGROUND

Wireless electronic devices typically handle one or more cellular communication standards, and/or wireless connectivity standards, and/or broadcast standards, each standard being allocated in one or more frequency bands, and the frequency bands being contained within one or more regions of the electromagnetic spectrum. More and more, wireless devices require operation at different communication standards, requiring large operation bandwidths and/or high efficiencies for covering the market needs.

For that purpose, nowadays a wireless electronic device must include a radiating system capable of operating in one or more frequency regions with an acceptable radio-electric performance, typically in terms of, for instance, reflection coefficient and/or impedance bandwidth and/or gain and/or efficiency and/or radiation pattern. Besides, the integration of the radiating system within the wireless electronic device must be effective to ensure that the overall device attains good radio-electric performance, evaluated such as for example in terms of radiated power, received power, sensitivity, without being disrupted by nearby electronic components and/or human loading.

The space within a wireless electronic device is usually limited and the radiating system has to be fitted in the available space. So, the radiating system is expected to be small to occupy as little space as possible within the device. The available space is even more critical in the case in which the wireless device is a multifunctional wireless device, requiring operation at more than one communication standards for covering several communication services. Besides radio-electric performance, not-enough small sizes and interaction with human body and nearby electronic components, one of the current limitations of prior-art is that generally the antenna system is customized for every particular wireless handheld device model.

Developing a wireless device including a radiating system of small dimensions that features a flexible configuration, able to cover multiple bands and able to operate at least at one communication standard, would be an advantageous solution suitable for covering real market needs.

There are in the market booster solutions that cover operation at frequency bands allocated in one or more frequency regions. As described in the owned U.S. Pat. No. 9,130,259 B2, a booster element is a non-resonant element that excites at least a radiation mode in a ground plane layer comprised in the radiating structure integrated in the wireless device. One of the advantages of booster solutions is the reduced size of the booster element or elements comprised in the radiating system that characterizes these solutions. However, solutions covering large bandwidths and/or providing multiband operation covering bands at low frequencies, like for example LTE700, and more particularly for the case of multi-region solutions operating at both low-frequency and high-frequency regions, like for example solutions requiring large bandwidths covering ranges from 698 MHz to 960 MHz and from 1710 MHz to 2690 MHz, require a minimum size and/or volume of the booster element or more than one or even more than two booster elements. There also exists booster solutions as disclosed in US 2017/0202058 A1 including a radiofrequency system comprising tunable components that allow a reduction of the size and/or the number of booster elements, reducing the space needed to allocate the antenna system into the wireless device. Nevertheless, the bandwidths reached by a tunable solution are not large enough to cover the bandwidth demands related to a wireless device, particularly in environments where spectrum aggregation and carrier aggregation requires an instantaneous use of the entire spectrum as in the present invention.

U.S. Pat. No. 9,331,389 B2 also provides a stand-alone component comprising at least two radiation boosters embedded in a unitary dielectric-material structure or support. The radiation boosters comprised in the stand-alone component can be connected between them by an external circuitry, as for instance a SMD component, so as to form a single electrically functioning unit. The maximum size of a radiation booster is smaller than 1/30 times the wavelength of the lowest frequency of the frequency region or regions of operation of the device. In some examples such a size can be smaller than 1/20 times the wavelength. Another characteristic of radiation boosters concerns its radiation characteristics, featuring a poor radiation efficiency when they are considered as a stand-alone element, which is in concordance with their non-resonant nature. With the purpose of providing an illustrative example of the radiation properties of a booster, a test platform of characterization is provided in patent application WO 2016/012507A1. The test platform comprises a square conductive surface and a connector electrically connected to the booster to be characterized. For example, such a platform is described in more detail in WO 2016/012507A1 together with the radiation and antenna efficiencies measured at low frequencies, below 1.0 GHZ, for the case of a booster bar element, arranged so that its largest dimension is perpendicular to the conductive surface. It has been measured a radiation efficiency below 5% for the booster element.

Other antenna technologies developed for communications systems comprised in multiband wireless devices have focused on solutions containing antenna elements instead of non-resonant elements for providing operation at the sought bands. The invention disclosed in the owned U.S. Pat. No. 9,130,267B2 relates to multiband wireless devices including an antenna system operative also at multiple frequency regions, the antenna system matched by a matching and a tuning system. In another prior-art commonly owned patent application U.S. Ser. No. 15/621,792 there is disclosed a radiating system that operates in multiple bands normally allocated in several frequency regions, the radiating system comprising an antenna element solution including a radiofrequency system comprising at least a matching network configured for providing operation at both low-frequency and high-frequency regions. The length of the antenna element is optimized in such a way that it helps to maximize bandwidth at the low frequency region (LFR, for example 698 MHz-960 Mz) and at the high frequency region (HFR, 1710 MHZ-2690 MHZ) at the same time. In this sense, there is a trade-off when designing a multi-band antenna based on the solution since if the length is large to optimize the LFR, it could drop the performance at the HFR. On the contrary, if the length is made short in order to optimize the performance at HFR, the performance at LFR drops. So, when more challenging performances are sought, current solutions found in prior-art usually are not able to achieve the demanding requirements. A solution according to the present invention provides improved radio-electric performances covering the required operation needs related to current wireless devices.

Other antennas comprising multiple elements usually configured for operating at different bands, like for example patents U.S. Pat. No. 6,664,930 B2 or U.S. Pat. No. 5,504,494, are found in prior-art. Normally, the elements comprised in those multi-element antennas found in prior-art are usually radiating portions contained in the whole antenna. The radio-electric contribution of those elements to the operation of the whole antenna is normally configured for each element with a particular configuration, which means that each radiating portion is specifically configured to contribute to the whole radiation process of the antenna and, consequently, to the communication features of the wireless device.

Additionally, an antenna system according to the present invention can also be configured for providing MIMO operation. In prior-art there already exist MIMO solutions including antenna structures comprising more than one antenna elements decoupled between them by a multi-mode antenna structure not including a decoupling network U.S. Pat. No. 8,547,289 B2.

Therefore, a wireless device not requiring a complex and large antenna able to provide suitable radio-frequency performance in a wide range of communication bands within multiple regions of the electromagnetic spectrum and able to cover different communication standards, would be advantageous. A wireless device according to this invention fulfills those requirements by including a simple, small and modular antenna system that provides flexibility in allocating frequency bands and versatility for covering different communication services. A better performance, evaluated as for example in terms of bandwidth and/or efficiencies, than current solutions such as for example CUBE mXTENDTM (FR01-S4-250) is achieved with a wireless device related to the present invention when including low-frequency bands as for instance mobile LTE700 band (698 MHz-746 MHz). Furthermore, an antenna system and/or a multi-section antenna component related to this invention, which can be easily integrated in such a wireless device, is advantageously designed and fabricated in one single piece, allowing a reduction of the production cost of the antenna component and the antenna system, since the antenna system does not need different pieces for providing operation at different communication standards. Additionally, an antenna component related to this invention can also be a thin, low-profile component or piece, able to be allocated in wireless devices featuring reduced profiles.

SUMMARY

It is an object of the present invention to provide a wireless electronic device (such as for instance but not limited to a mobile phone, a smartphone, a phablet, a tablet, a PDA, an MP3 player, a headset, a GPS system, a laptop computer, a gaming device, a digital camera, a wearable device like a smart watch, a sensor, or generally a multi-function wireless device which combines the functionality of multiple devices) comprising a radiating system that covers a wide range of radiofrequencies able to handle multiple communication bands while exhibiting a suitable radiofrequency performance. More concretely, it is the aim of the present invention to provide a wireless device and a simple and modular antenna system, as well as a multi-section or multi-stage antenna component included in the antenna system, able to provide different functionalities to the device depending on its communication requirements. A wireless device according to the present invention includes a modular antenna system comprising at least a multi-section antenna component configured for providing operation at multiple bands within at least one communication standard. An antenna system according to this invention, containing at least one multi-section antenna component that comprises at least two sections, provides different functional configurations providing a flexible and versatile antenna system able to cover different communication services. In some antenna system embodiments, at least two antenna components comprised in the antenna system are electrically connected between them. Additionally, an antenna system and/or a multi-section antenna component related to this invention is advantageously designed and fabricated in one single piece, which reduces the production cost of the antenna component and the antenna system, since the antenna system does not need, in most embodiments, different pieces for providing operation at different communication standards. The antenna component is, in some embodiments, a thin, low-profile component or piece, able to be allocated in wireless devices featuring reduced profiles. So, the thickness of an antenna component related to this invention is, in some embodiments, a value between $1/60$ and $1/45000$ times the free-space wavelength corresponding to the lowest frequency of operation of the device that comprises an antenna system including the antenna component. In some other embodiments the thickness features a value between $1/60$ and $1/5000$ times, or between $1/70$ and $1/500$ times, or even between $1/100$ and $1/500$, or even between $1/140$ and $1/450$, or even between $1/200$ and $1/450$ the wavelength.

A wireless device related to the present invention contains a radiating system, or radiating structure, comprising at least one ground plane, normally a ground plane layer mounted on a PCB, at least one port and a modular multi-stage antenna system 102*b*, 102*c*, 202 containing at least one antenna component, like 101b, 101c, 201 elements illustrated in FIGS. 1*a*-1*c* and FIG. 2, wherein at least one of the one or more antenna components is a multi-section antenna component, the multi-section antenna component comprising at least two sections, each section being a part of the antenna component comprising a conductive element, the conductive elements comprised in different sections being spaced apart by a gap in a first direction, the gap being a minimum distance between two conductive elements comprised in different sections. The gap featuring, in some embodiments, a length in a range between 0.25 mm and 4 mm, or between 0.25 mm and 3 mm, or even between 0.5 mm and 2.0 mm. The first direction is, in some embodiments, a direction being parallel to the at least one ground plane layer.

In the context of the present invention the terms radiating system and radiating structure are used interchangeably. A radiating system, or radiating structure, according to the present invention includes at least one port, each of the at least one port comprising a feeding system that connects one of the sections comprised in the antenna component comprised in the antenna system integrated in the wireless device to the corresponding port. At least a matching network is included in the feeding system, with the purpose of matching the device at the sought frequency bands at the corresponding port, the port being defined between a terminal of the at least one matching network included in the feeding system, and the at least ground plane layer comprised in the radiating structure. The use of a multi-section antenna component in the antenna system provides flexibility in the allocation of frequency bands. Depending on the functionality requirements demanded for the wireless device that integrate the modular multi-section antenna system, a radiating system or radiating structure included in a wireless device according to this invention is accordingly configured for covering operation at the required communication standards.

A modular multi-stage antenna system related to this invention provides flexibility and case of integration of the antenna system within the available space in the wireless device. The antenna components comprised in the modular antenna system can be allocated in different arrangements, as for example the ones presented in FIG. 1*b* and FIG. 1*c*. FIG. 1*a* shows an example of a wireless device integrating the examples of antenna systems provided in FIG. 1*b* and FIG. 1*c*, illustrating the usefulness of having a modular antenna system like the one disclosed in the present invention, which is easily fitted in a host wireless device in function of for example the available space 103, 104. The examples of antenna system arrangements shown in FIG. 1*b*, FIG. 1*c* and FIG. 2 are provided as illustrative examples but never with limiting purposes. The antenna system arrangements shown in FIG. 1*b* and FIG. 1*c* include antenna components that are supported on different pieces, so that each antenna component is mounted on one single separated piece but not the whole antenna system, the antenna component being easy to combine with other antenna components in different arrangements and configurations in an antenna system, as illustrated in FIGS. 1*a*-1*c*. However, the antenna system 202 example provided in FIG. 2 comprises three antenna components 201, all of them supported on the same single block or unit, the whole antenna system supported on a single unit or piece. In other embodiments, an antenna system related to this invention includes only one antenna component, the antenna component being a multi-section antenna component, providing also a single-unit or piece antenna system. Having an antenna system mounted on a single unit or piece allows a reduction of the production cost of the antenna system. So, contrary to other prior-art antenna technologies, an antenna component related to this invention is a unit or piece, but not a portion of the antenna itself, contained in a modular antenna system comprising at least one of the antenna components. Different manufacturing technologies can be applied for producing the antenna components or antenna system pieces used in the modular antenna system described in the context of the present invention. So, some embodiments of the antenna system contain SMD antenna components, others contain LDS antenna components, or stamped antenna components, or components printed on flex-film materials, or embodiments even comprising components manufactured on metal-frame structures, all these examples provided as illustrative but not as limiting examples.

As mentioned before, an antenna system according to the present invention includes at least a multi-section antenna component. A multi-section antenna component related to the present invention comprises at least two sections, each section comprising one conductive element. In some embodiments of an antenna system related to this invention, at least one of the multi-section antenna components comprised in the antenna system described herein, contains at least one flat section, the section featuring a two-dimensional shape or geometry, i.e., in the context of the present invention a shape with a thickness which is negligible in terms of the operation wavelength (e.g. the 1/45.000 of the free-space wavelength to the lowest frequency of operation of the device). In the context of the invention here disclosed the frequency range of operation of a device or a radiating system related to this invention refers to a frequency range in which the device or radiating system provides operation, including at least a first frequency range, the first frequency range comprising a first highest frequency and a first lowest frequency. The operation frequency range comprising a lowest frequency of operation and a highest frequency of operation. In some embodiments, the lowest frequency of operation is the first lowest frequency and/or the highest frequency of operation is the first highest frequency. Other embodiments of antenna system contain multi-section antenna components comprising only volumetric sections, or no-flat sections, which occupy or fulfill a volume, the sections featuring a three-dimensional shape. In general, a volumetric section comprised in an antenna component related to this invention contains a volumetric conductive element, also featuring a three-dimensional shape. Other embodiments of antenna system containing antenna components wherein at least one of the antenna components comprises at least one volumetric section, contain at least one volumetric section comprising at least one flat conductive element characterized by a two-dimensional shape or geometry, as defined before. So, some embodiments related to an antenna component according to the present invention are volumetric structures but not the conductive elements contained in the sections comprised in the antenna component.

Additionally, the conductive elements or sections included in an antenna component disclosed herein are arranged at one or more layers or levels of conductive elements or sections. The conductive elements or sections comprised in a same layer comprised in the antenna component are contained in a same direction not perpendicular to the ground plane layer included in a radiating structure according to this invention, also comprising the antenna component. The conductive elements or at least two conductive elements, arranged in a same layer or level or at different ones, included in an antenna component are, in some embodiments, electrically-connected between them. So, an antenna component related to the present invention comprises at least two sections, including a conductive element each, connected between them in some embodiments, in different configurations, for providing the sought communication requirements with a versatile antenna system. In some of the multi-section antenna component examples containing at least two conductive elements arranged at different layers, the connections between the conductive elements from one layer and the conductive elements from another layer are usually implemented with vias, but those connections are not limited to this type of connection. In some examples, the conductive elements arranged at different layers are not connected by a physical electrical connection but they are coupled between them, the conductive elements usually overlapped between them when one layer is projected to the other. Some of the embodiments including conductive elements in a same layer connected between them are connected by a simple short-circuit connection. In other embodiments, the conductive elements are connected by an electrical connection containing at least one electrical circuit element, as for example, but not limited to, electronic components, passive or active components, or transmission lines, or filters, or conductive traces or strips, or combinations of those elements. In the context of the invention here disclosed, the electrical connection does not prevent from geometrically identifying the conductive elements included in different sections, the conductive elements spaced apart by a gap in a first direction. Furthermore, some embodiments of an antenna system described in the context of this invention contain antenna components connected between them, independently from the connections included between sections comprised in the multi-section antenna components comprised in the antenna system.

According to the dimensions related to a conductive element or a group of conductive elements that are electrically connected one to another, comprised in an antenna component according to the present invention, a multi-section antenna component related to the invention comprises booster elements and/or radiating elements. A booster element has a maximum size smaller than 1/20 times the free-space wavelength corresponding to the lowest frequency of operation. In some embodiments the maximum size of the booster element is smaller than 1/30 times the wavelength. The maximum size is defined by the largest dimension of a booster box that completely encloses the booster element, and in which the booster is inscribed. More specifically, a booster box for a booster is defined as being the minimum-sized parallelepiped of square or rectangular faces that completely encloses the booster and wherein each one of the faces of the minimum sized parallelepiped is tangent to at least a point of the booster. In some examples, one of the dimensions of a booster box is substantially smaller than any of the other two dimensions, or even be close to zero. In such cases, the booster box collapses to a practically two-dimensional entity. The term dimension then refers to an edge between two faces of the parallelepiped. In the context of the present invention, a conductive element contained in a section or a set or group of conductive elements connected between them comprised in an antenna component of the present disclosure, featuring a maximum size bigger than 1/20 times the wavelength, is not a booster but a radiating element. Additionally, a booster element in some embodiments is characterized by a resonance frequency bigger than or equal to 3 times the lowest frequency of operation of the device. Some possible minimum ratios between the resonance frequency of a booster element and the lowest frequency of operation of the device are 3.0, 3.4, 3.8, 4.2, 4.6, 5.0, 5.4, 6.0 or even 7.0.

Another difference between a booster element and a radiating element, apart from their maximum size relative to the operation wavelength, are, in some embodiments, the radiation properties related to those elements. Patent WO 2016/012507 A1 provides an example of the efficiencies corresponding to a booster bar when measured at low frequencies around 900 MHz in a test platform (as described on: page 20, lines 4 to 33; page 36, lines 21 to 32; and page 37, lines 1 to 30 of patent document WO 2016/012507 A1) where the booster is arranged so that its largest dimension is perpendicular to a conductive surface. It has been measured a radiation efficiency below 5% for the booster element. Accordingly, some embodiments of a multi-section antenna component described in the context of the present invention, also characterized in the mentioned test conditions particularly at low frequencies like for example 900 MHZ, feature efficiencies higher than 5%.

A multi-section antenna component related to the present invention, comprising at least two sections, connected between them in some embodiments, features a maximum size bigger than 1/30 times the free-space wavelength corresponding to the lowest frequency of operation of the radiating system or the device. The maximum size being also smaller than 1/5 times the wavelength. In some embodiments, the multi-section antenna component features a maximum size bigger than 1/20 times the wavelength. Additionally, according to the dimensions related to a conductive element or a group of conductive elements that are electrically connected one to another, comprised in an antenna component according to the present invention, a multi-section antenna component related to the invention comprises booster elements and/or radiating elements. So, some antenna system embodiments related to the present invention comprises at least a multi-section antenna component containing at least a radiating element, as defined in the context of the present invention, featuring, as described before, a maximum size bigger than 1/20 times a free-space wavelength corresponding to a lowest frequency of operation of the device. Some other antenna component embodiments included in an antenna system related to this invention comprise a conductive element or group of conductive elements electrically-connected between them featuring an electrical length larger than 1/10 times the free-space wavelength corresponding to a frequency three times the lowest frequency of operation of the device.

An illustrative example of a multi-section antenna component related to the present invention is provided in FIG. 3. Advantageously, an antenna component related to this invention, comprising more than one section, is mounted on a support, making up a single piece or block, as already described, the support usually being, but not limited to a common dielectric substrate. Having an antenna component able to cover more than one communication standards, mounted on a single piece, reduces the production cost of the antenna component, and consequently of an antenna system comprising one the antenna component, and provides a simple multi-functional antenna component and system. The antenna component provided in FIG. 3 comprises more than one section 301 arranged on two opposite layers 302 and 303 or faces of a support, in this example a dielectric material substrate 304 of a certain thickness and the sections comprising rectangular or square conductive elements 305 of different dimensions. In the context of this invention, the thickness of the support or piece that contain the antenna component is measured in a direction perpendicular to the ground plane layer comprised in the radiating structure that also comprises the antenna component. Some embodiments of the antenna component, characterized by a thin or low profile, feature a thickness comprised within the range 1/60 and 1/45000 times the free-space wavelength corresponding to the lowest frequency of operation of a device including an antenna system related to the invention disclosed herein comprising the antenna component. Some of those antenna component embodiments feature a thickness between 1/70 and 1/500 times the wavelength, or between 1/100 and 1/500, or even between $1/140$ and $1/450$, or even between $1/200$ and $1/450$ the wavelength. An antenna component containing conductive elements arranged at different layers, wherein the conductive elements from one of the layers, usually an outer or external layer, feature different dimensions and/or shapes from conductive elements contained in another opposite outer or external layer, provides a flipping or reversible component. So, a reversible antenna component comprises at least two opposite outer conductive elements layers or sections layers. As described before, some of the conductive elements are connected between them in some embodiments, as it is the case of the example provided in FIG. 3, where some of the conductive elements comprised in a same layer are connected by a connecting element 306. The connecting element is, as already mentioned, an electrical connection, as for example a short-circuit in some embodiments or an electrical connection containing at least one electrical circuit element in other embodiments, as for example but not limited to electronic components, passive or active components, or transmission lines, or filters, or conductive traces or strips. Other embodiments contain combinations of the elements that connect the corresponding conductive elements. In the context of the invention here disclosed, the connecting element does not prevent from geometrically identifying the conductive elements included in different sections, the conductive elements spaced apart by a gap in a first direction. As aforementioned, the conductive elements comprised in the multi-section antenna component shown in FIG. 3 are disposed on two faces of a dielectric support. Some of the conductive elements are also connected between them by conducting vias 307, but other connecting mechanisms are used in other embodiments.

Another aspect of the invention relates to a method for providing a wireless device with a radiating system, the method comprising: providing an antenna system comprising at least one antenna component, the at least one antenna component containing at least two conductive elements; providing the at least one antenna component on a first portion of a printed circuit board of the wireless device, the printed circuit board comprising at least one ground plane layer in a second portion thereof and a ground plane clearance in the first portion; and electrically connecting a first matching network to the antenna system, the first matching network being adapted to impedance match the antenna system to a first frequency range at a first port; the at least one antenna component has a maximum size bigger than $1/30$ times and smaller than $1/5$ times a free-space wavelength corresponding to a first lowest frequency of the first frequency range; and at least two of the at least two conductive elements are spaced apart.

The method makes possible to provide a wireless device comprising a versatile radiating structure based on at least one antenna component comprising a plurality of conductive elements. Each matching network (e.g. the first matching network) of the radiating system is adjusted to match the tuned antenna component to a frequency range of operation at a port thereof.

At least two of the at least two conductive elements, or each of the at least two conductive elements, are separated by a gap, the gap being a minimum distance between each pair of conductive elements. In some embodiments, the separations between different conductive elements correspond to a same gap, whereas in some other embodiments they correspond to different gaps.

In some embodiments, the gap between the at least two of the at least two conductive elements of the at least one antenna component (e.g. a first antenna component thereof, a second antenna component thereof, etc.), or the gap between the at least two conductive elements of the at least one antenna component, comprises a length greater than or equal to 0.25 mm and less than or equal to 4.0 mm. In some other embodiments, the gap comprises a length greater than or equal to 0.5 mm and less than or equal to 2.0 mm. In some examples, the minimum distance corresponding to the length of the gap is measured in a first direction that is parallel to the at least one ground plane layer, namely, the first direction corresponds to a vector contained in a plane of the ground plane layer.

In some embodiments, the first frequency range comprises the first lowest frequency and a first highest frequency that is equal to or less than 0.960 GHz. In these embodiments, the first lowest frequency is equal to or greater than 0.698 GHZ.

In some embodiments, the first frequency range has a bandwidth of at least 15.0%. In some of these embodiments, the bandwidth of the first frequency range is of at least 31.0%.

In some embodiments, the at least one antenna component is characterized by a maximum size bigger than $1/30$ times and smaller than $1/5$ times a free-space wavelength corresponding to the first lowest frequency.

In some embodiments, the method further comprises electrically connecting the at least two conductive elements with a short-circuit or at least one electronic component.

The at least one electronic component may be e.g. an inductor, a capacitor, or a combination thereof. In some cases, the at least one electronic component comprises a filter, in which case the electrical length is made different for different frequencies, or an isolation bridge, in which case the wireless device may be provided with MIMO with a same antenna component, for instance.

In some embodiments, the at least two conductive elements comprise three conductive elements, the three conductive elements being provided in a piece comprising a dielectric material. In some of these embodiments, the first matching network is electrically connected to a first conductive element of the three conductive elements. In some of these embodiments, the method further comprises electrically connecting a second matching network to a third conductive element of the three conductive elements, the second matching network being adapted to impedance match the antenna system to a second frequency range at a second port. In some of these embodiments, the method further comprises electrically connecting the first conductive element to a second conductive element of the three conductive elements with a short-circuit or at least one electronic component. In some of these embodiments, the method further comprises electrically connecting the third conductive element to one of the first and second conductive elements with a filter or an isolation bridge.

The at least one electronic component may be e.g. an inductor, a capacitor, or a combination thereof.

In some embodiments, at least two of the at least three conductive elements are arranged on different layers of the at least one antenna component. In some embodiments, the method further comprises electrically connecting, with at least one via, one or more conductive elements of the at least three conductive elements with another one or more conductive elements of the at least three conductive elements, the one or more conductive elements being arranged on a first layer of the at least one component, and the another one or more conductive elements being arranged on a second layer of the at least one component.

In some embodiments, the second frequency range comprises a second highest frequency that is equal to or less than 3.80 GHz and a second lowest frequency that is equal to or greater than 1.71 GHz.

In some embodiments, the at least one antenna component has a thickness smaller than 1/60 times a free-space wavelength corresponding to the first lowest frequency. In some embodiments, the at least one antenna component has a thickness smaller than 1/60 times a free-space wavelength corresponding to the second lowest frequency. That is, each antenna component of the at least one antenna component features a reduced thickness that eases the integration of the same within the wireless device. Each antenna component of the at least one antenna component may include a piece comprising a dielectric material on which the at least two conductive elements are provided. In some cases, the thickness of the at least one antenna component corresponds to a thickness of the piece, or the thickness of both the piece and one conductive element provided thereon, or the thickness of both the piece and the at least two conductive elements provided thereon.

In some embodiments, the at least one antenna component comprises a radiating element. In some of these embodiments, the radiating element has a maximum size bigger than 1/20 times a free-space wavelength corresponding to the first lowest frequency or the second lowest frequency.

Similar advantages as those described for previous aspects of the invention may also be applicable to this aspect of the invention.

BRIEF DESCRIPTION OF THE DRAWINGS

The mentioned and further features and advantages of the invention become more apparent in view of the detailed description, which follows this drawings description with some particular examples of the invention, referenced by the accompanying drawings, given for purposes of illustration only and in no way meant as a definition of the limits of the invention.

DETAILED DESCRIPTION

Below, some other embodiments related to the present invention are described. These embodiments are provided as illustrative but not as limiting examples of the invention here disclosed. In the context of the present invention, the characteristics and teachings related to each embodiment are combinable with the features of other embodiments of the invention.

Figure 1A:
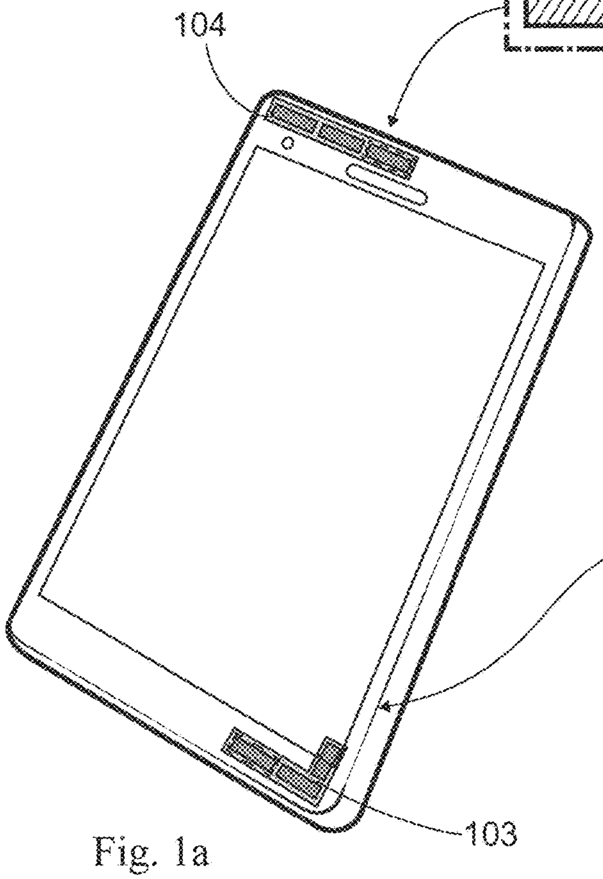
FIG. 1*a* shows some possible dispositions of the modular antenna systems within a wireless device.
Figure 1B:
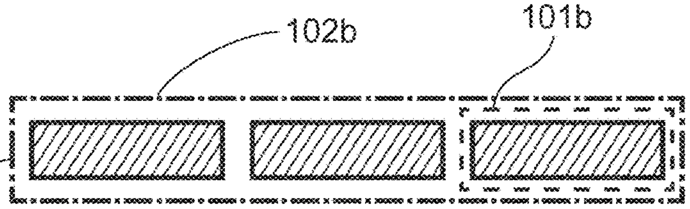
FIGS. 1*b* and 1*c* shows two arrangements of a modular antenna system according to the invention, comprising at least one antenna component, highlighted with a dashed square.
Figure 1C:
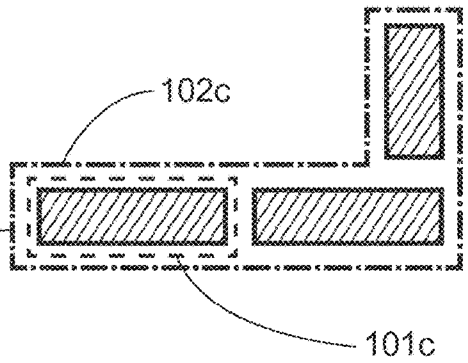
Figure 2:
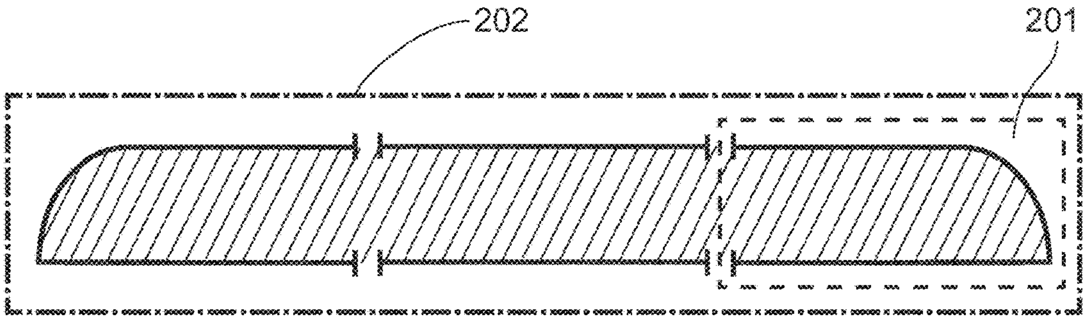
FIG. 2 shows a modular antenna system comprising at least one antenna component, the antenna system mounted on a single piece.
Figure 3:
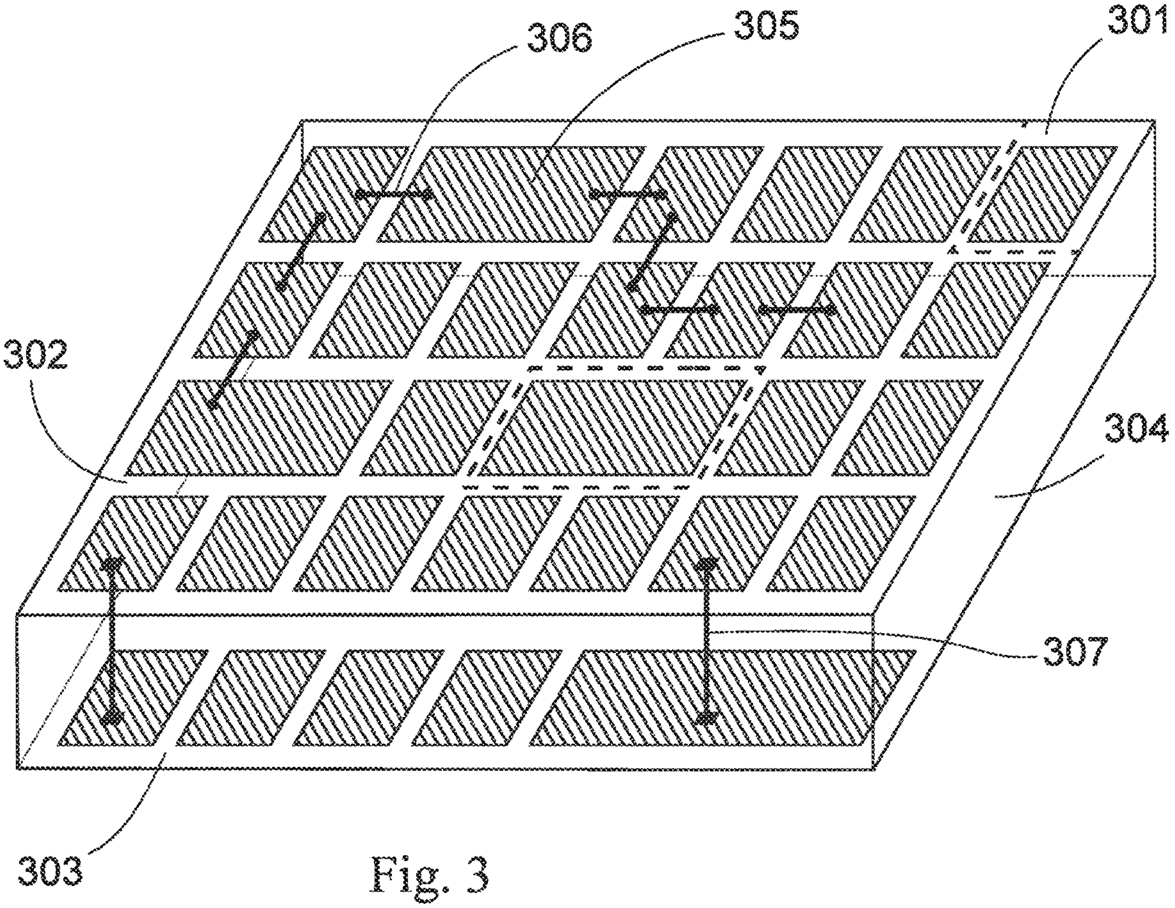
FIG. 3 provides an example of a multi-section antenna component related to the present invention, the antenna component comprising more than one sections disposed on two opposite faces of a support, the sections comprising rectangular or square conductive elements of different dimensions.
Figure 4:
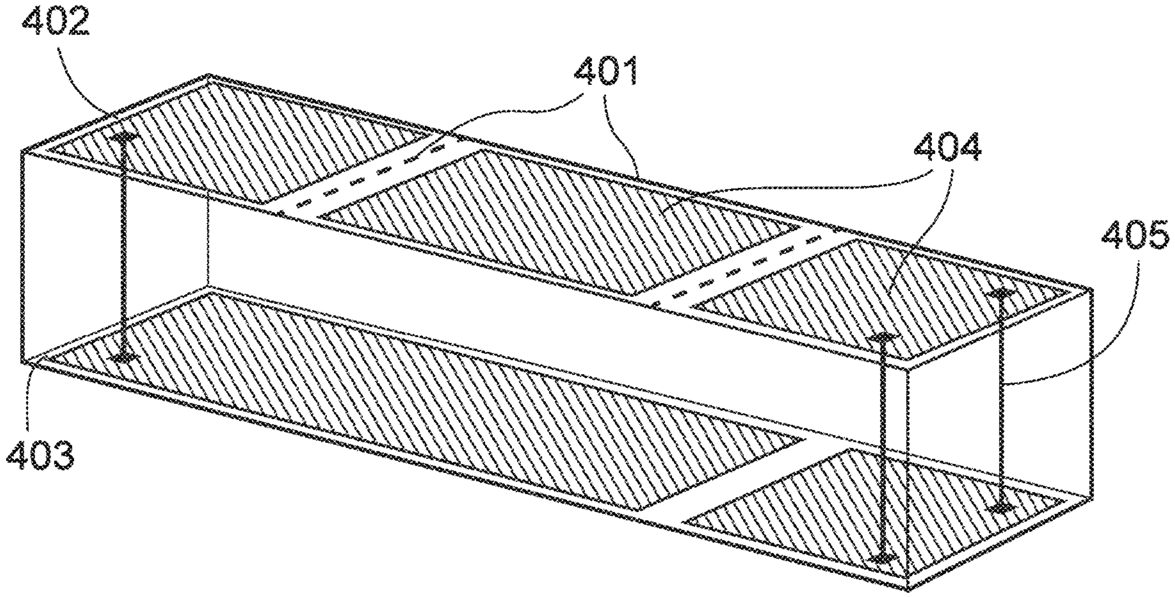
FIG. 4 illustrates an example of a multi-section reversible antenna component comprising a different number of sections at the top face than at the bottom face of a support that contains the antenna component, disposed in a single row.

An embodiment of a multi-section reversible antenna component comprising a different number of sections at two opposite outer faces, more specifically at a top face and at a bottom face, of a support that contains the antenna component, arranged in a single row, is provided in FIG. 4. The comprised sections 401 are arranged in a single row and are disposed on two layers, or more particularly two faces 402 and 403 of a dielectric piece used as support. The conductive elements 404 contained in the sections feature different dimensions between them. Like in the previous embodiment, some of the conductive elements contained in sections from the two different faces are connected by vias 405. The ones that are not physically connected are electromagnetically coupled to their surrounding and corresponding bottom conductive elements.

Figure 5:
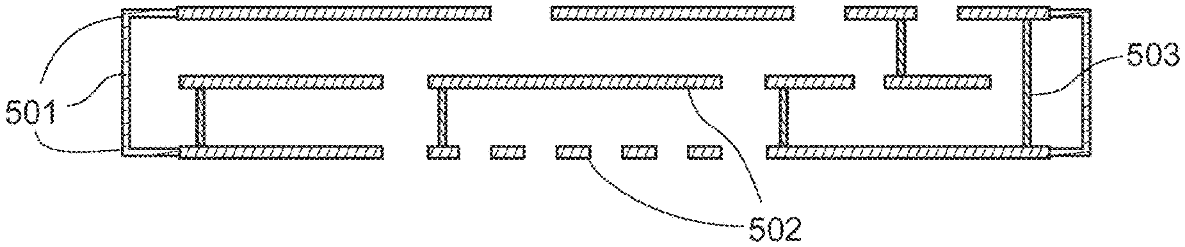
FIG. 5 shows a profile of a multi-layer multi-section antenna component, more concretely a three-layers example. The conductive elements comprised in each layer are arranged so that they define different patterns at the different layers. The conductive elements feature different dimensions between them.
Figure 6:
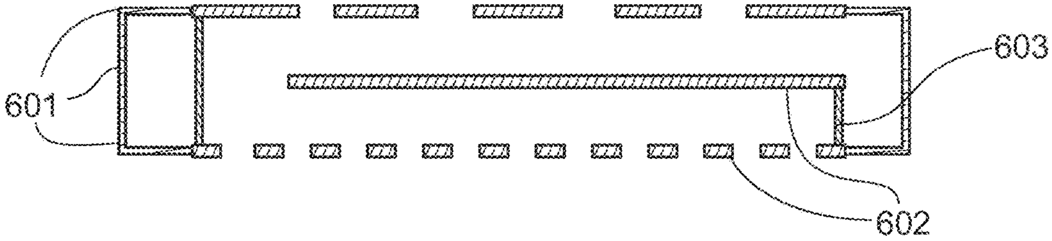
FIG. 6 Provides a profile of another embodiment of a three-layers multi-section antenna component, featuring different patterns of conductive elements than the embodiment provided in FIG. 5.
Figure 7:
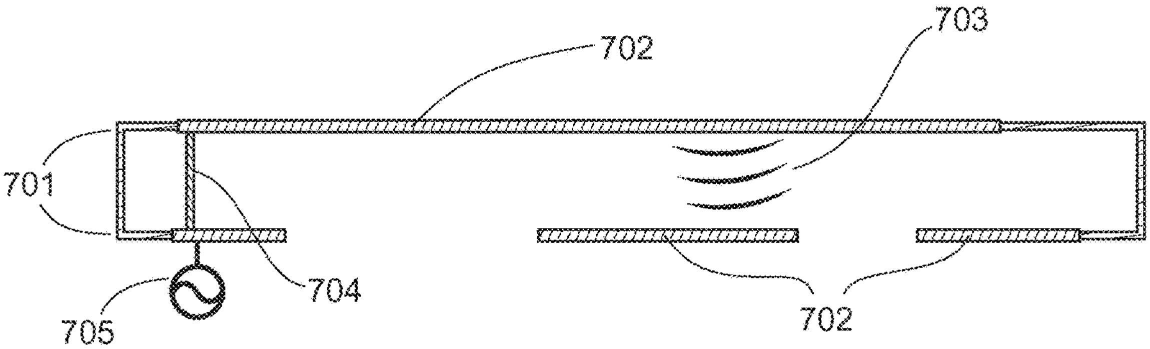
FIG. 7 Shows an example of a two-layers antenna component where the conductive elements comprised in the top layer are coupled to the conductive elements of the bottom layer.
Figure 8:
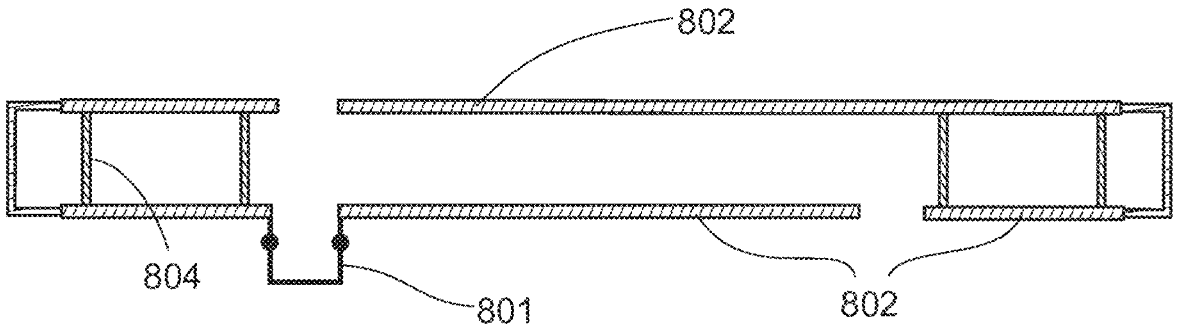
FIG. 8 Shows an example of a two-layers reversible antenna component where two bottom conductive elements are connected between them, illustrating an example of antenna component that can be configured for operating at different functional modes in function of the layer configured.
Figure 9:
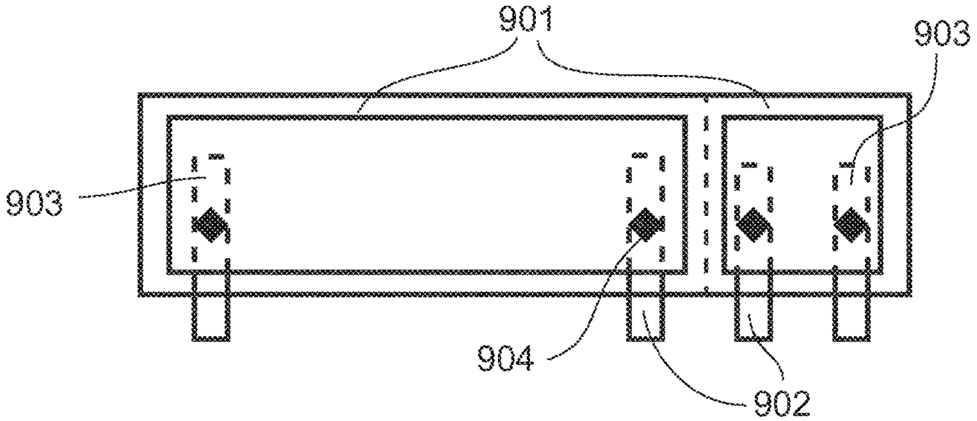
FIGS. 9-12 provide top-views of some non-reversible embodiments of two-layers multi-section antenna components featuring the same conductive elements patterns at both top and bottom layers.
Figure 10:
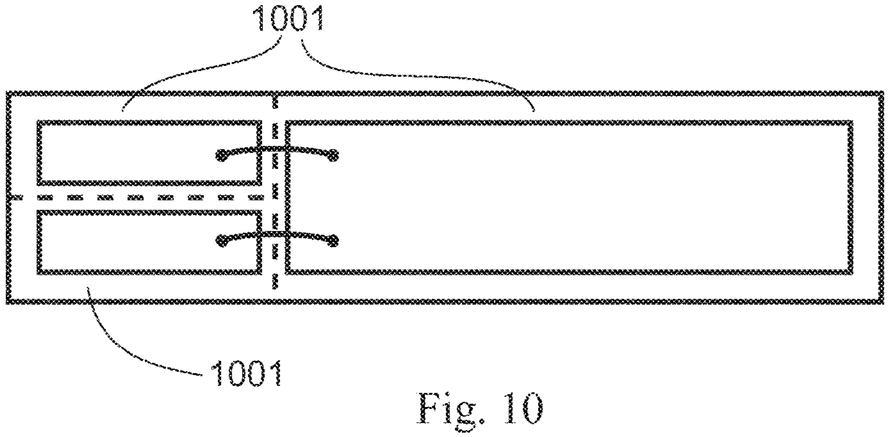
Figure 11:
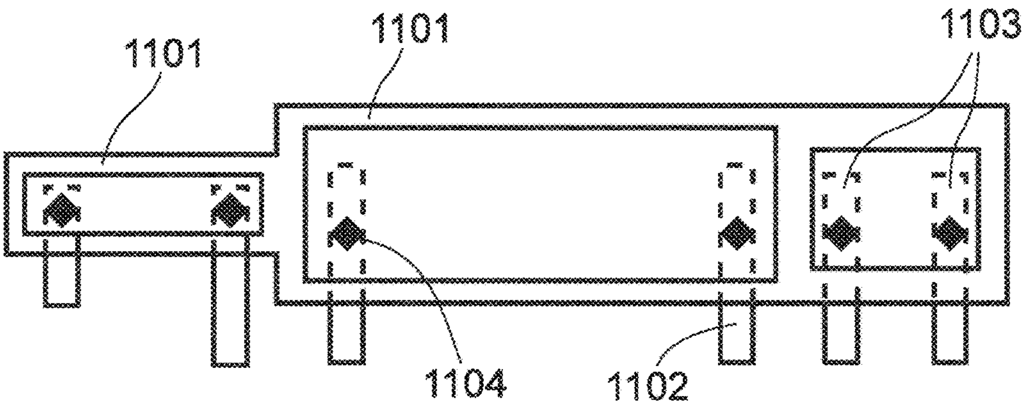
Figure 12:
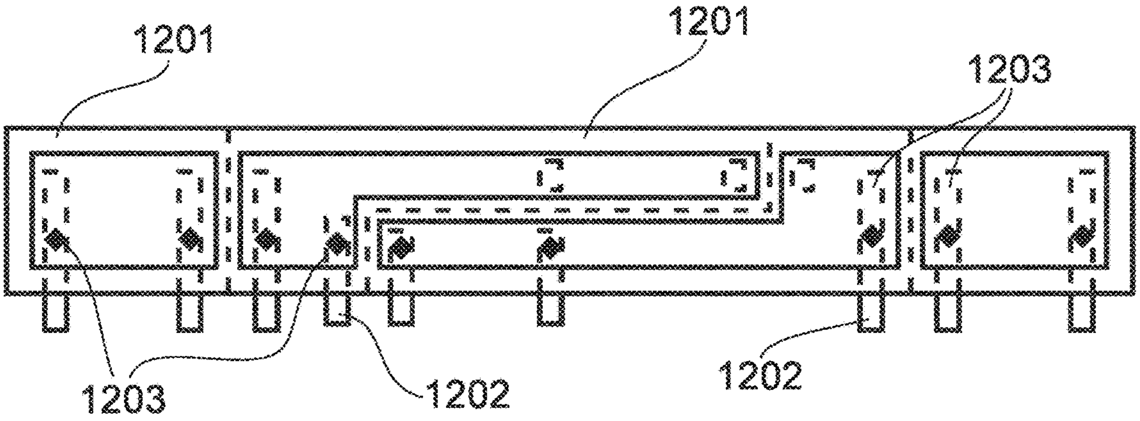

The profiles of some multi-layer embodiments of an antenna component related to the present invention are provided in FIG. 5 to FIG. 8. FIG. 5 presents an example of an antenna component comprising at least two layers, and more specifically an example of antenna component comprising three layers 501, supported by a dielectric substrate piece. FIG. 6 provides another example of a three-layer antenna component according to the invention. In those embodiments comprising more than two sections layers, a layer disposed between two other layers is an internal layer. The sections and conductive elements comprised in those embodiments are disposed in arrangements very different between them. In both examples, sections comprised in different layers contain conductive elements featuring different dimensions 502, and the pattern defined by the groups of conductive elements disposed at the different layers is different. Both embodiments illustrate examples of antenna components containing conductive elements at different layers connected between them by vias 503. An embodiment featuring different conductive elements patterns disposed at outer layers or faces comprised in the antenna component piece, provides a flipping component characterized by its capability of providing more than one functional mode. In FIG. 7, an antenna component comprising different sections arranged in two layers 701 is provided, the layers containing a different number of sections 702 each. This embodiment is an example of antenna component containing conductive elements coupled between them 703 instead of being electrically connected by a physical mechanism, meaning in this example that the conductive elements comprised in the bottom sections are coupled to a conductive element comprised in a top layer, which is connected by a via 704 to a feeding system 705. Finally, another multi-section antenna component containing two layers, comprising more than one section each, is provided in FIG. 8. This embodiment further contains a connection 801 between two bottom conductive elements or their corresponding sections, illustrating an example of antenna component configured for operating in different functional modes in function of the layer configured.

Other embodiments related to a multi-section antenna component according to the invention are provided in FIG. 9 to FIG. 13. The embodiments illustrate examples of two-layers antenna components that contain the same number of sections 901, 1001, 1101, 1201, also featuring the same shape at both a top and a bottom layers comprised in a support, typically a dielectric-material piece. So, a top-view showing one of the layers or faces comprised in each of the aforementioned embodiments is provided in the corresponding figures. These embodiments contain sections showing the same conductive elements patterns at both the layers providing the same possibilities of configuration when using either one or the other layer. The variety of shapes and sizes of the conductive elements contained in the sections comprised in the examples from FIG. 9 to FIG. 12 show that the possible sections patterns characterizing an antenna component related to the invention are diverse, those from FIG. 9 to FIG. 12 herein provided as illustrative examples but never with limiting purposes. The drawings from FIGS. 9, 11 and 12 further include some conducting strips 902, 1102, 1202 added below the antenna component piece connected to its bottom layer or face by connecting pads 903, 1103, 1203. The conducting strips are mainly used for allocating the necessary connecting elements that interconnect the sections of the antenna component in order to configure the antenna system for operating at the required communication bands.

Figure 13:
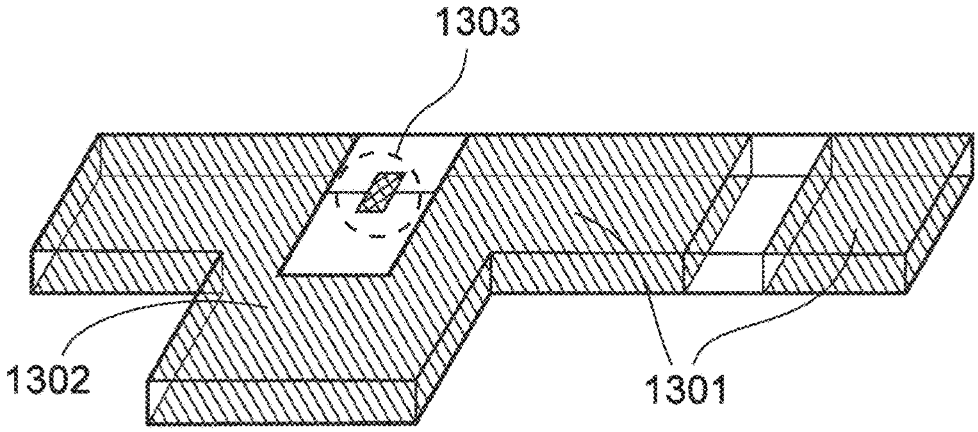
FIG. 13 illustrates an embodiment of antenna component featuring a miniaturized-shape including an additional component also for miniaturization purposes.

An embodiment representing an example of antenna component featuring a miniaturized-shape is provided in FIG. 13. More concretely, the antenna component comprises two sections 1301, wherein one is miniaturized by a meander-shape 1302, reducing the size of the antenna component. The meandering miniaturization technique applied in the embodiment from FIG. 13 is not the only possible miniaturization technique applicable to an antenna component related to the present invention. In some of those miniaturized embodiments, an additional component is further included, normally with the purpose of miniaturizing even more the corresponding section and consequently the antenna component, as for example illustrated by element 1303 in the embodiment provided in FIG. 13.

Figure 14:
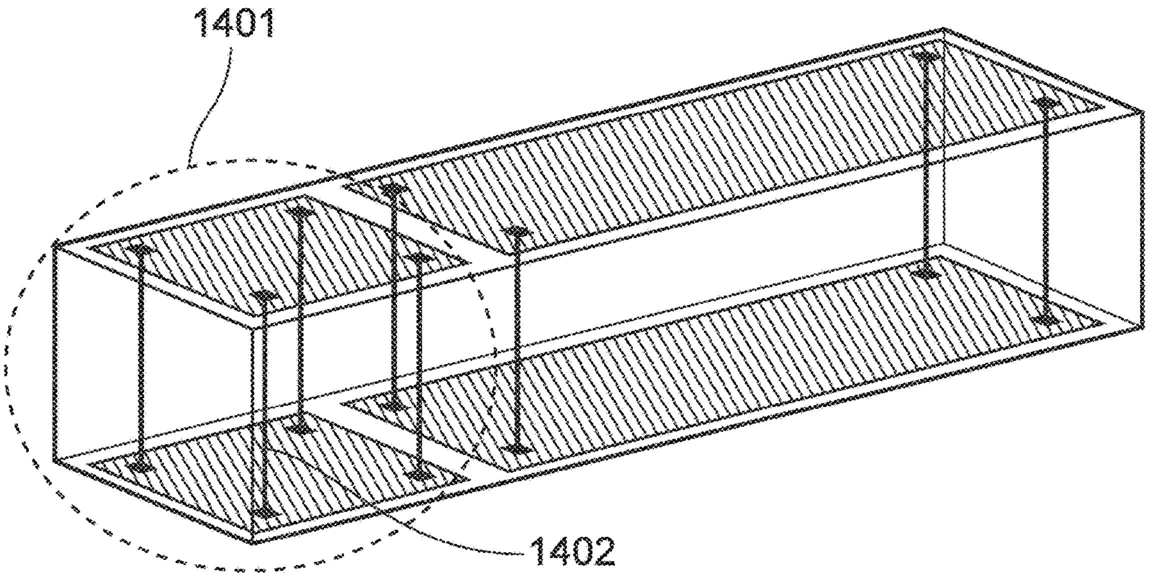
FIG. 14 provides an example of a multi-section antenna component comprising the same number of sections, in this case two, at the top face than at the bottom face of a support that contains the antenna component, disposed in a single row, the sections comprising conductive elements featuring the same dimensions at the different layers or faces and parallel and aligned between them.
Figure 15:
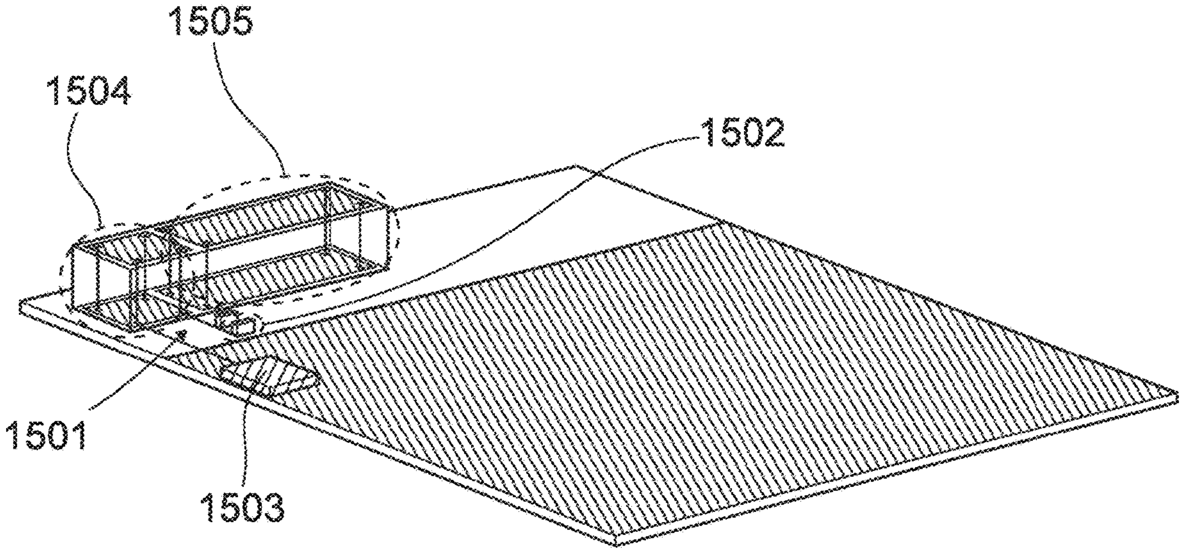
FIG. 15 provides an embodiment related to the present invention that contains an antenna system comprising a single multi-section antenna component containing two sections blocks connected between them by a components circuit. This embodiment is configured to provide operation at multiple frequency bands at a single port.
Figure 16:
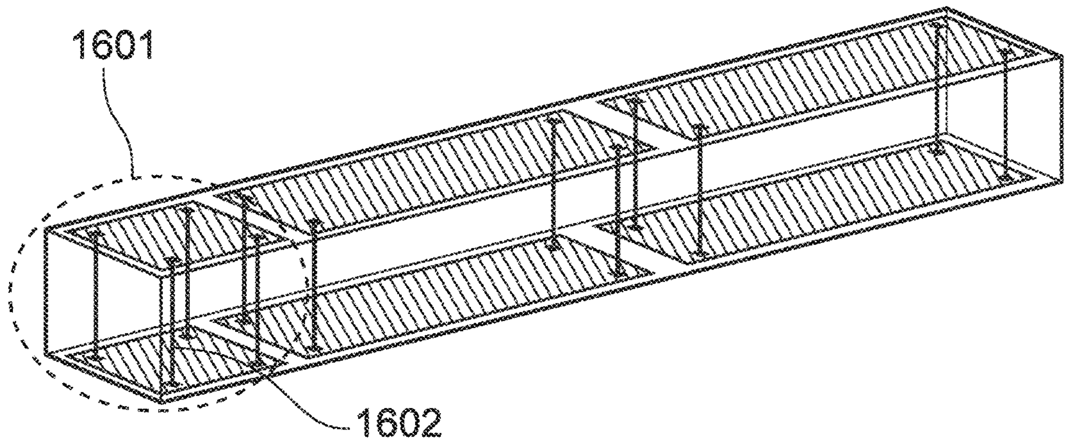
FIG. 16 provides an example of a multi-section antenna component comprising three sections blocks, each block containing two sections disposed at two different layers or faces of a support, the sections comprising conductive elements parallel and aligned between them featuring the same dimensions at the different layers or faces.

Other embodiments of a multi-section antenna component related to the present invention are presented in FIG. 14 and FIG. 15. These embodiments comprise the same number of sections at the top face than the bottom face of the support that contains the antenna component, the sections comprising conductive elements featuring the same dimensions at the different layers and parallel and aligned between them at the different layers levels. In the context of the present invention, conductive elements or sections, at different layers or levels connected between them form a sections block. In the embodiments from FIG. 14 and FIG. 15, the sections at different layers, or the aforementioned faces, comprised in the antenna component that contains a same number of sections comprising conductive elements of same dimensions at the different layers and aligned between them at the different layers or levels, are grouped in sections blocks 1401 as shown in FIG. 14. More specifically, the embodiment provided in FIG. 14 comprises two sections blocks 1401 and the embodiment provided in FIG. 16 comprises three sections blocks 1601, in both cases sections blocks adjacent one to each other disposed in a single row. The conductive elements comprised in the top sections are connected by vias 1402, 1602 to the conductive elements comprised in the bottom sections, just below the top ones, included in the same corresponding section block.

As already mentioned, a radiating structure according to the present invention includes at least one port. Each of the at least one port comprises a feeding system that connects one of the sections comprised in the antenna component comprised in the antenna system integrated in the wireless device to the corresponding port. At least a matching network is included in the feeding system, with the purpose of matching the device at the sought frequency bands at the corresponding port. The use of a multi-section antenna component in the antenna system provides flexibility in the allocation of frequency bands. Depending on the functionality requirements demanded for the wireless device that integrate the modular multi-section antenna system, an embodiment according to this invention is configured for covering operation at the required communication standards. Some of the possible configurations implemented with an antenna system related to the invention are provided hereinafter as illustrative examples.

Figure 17:
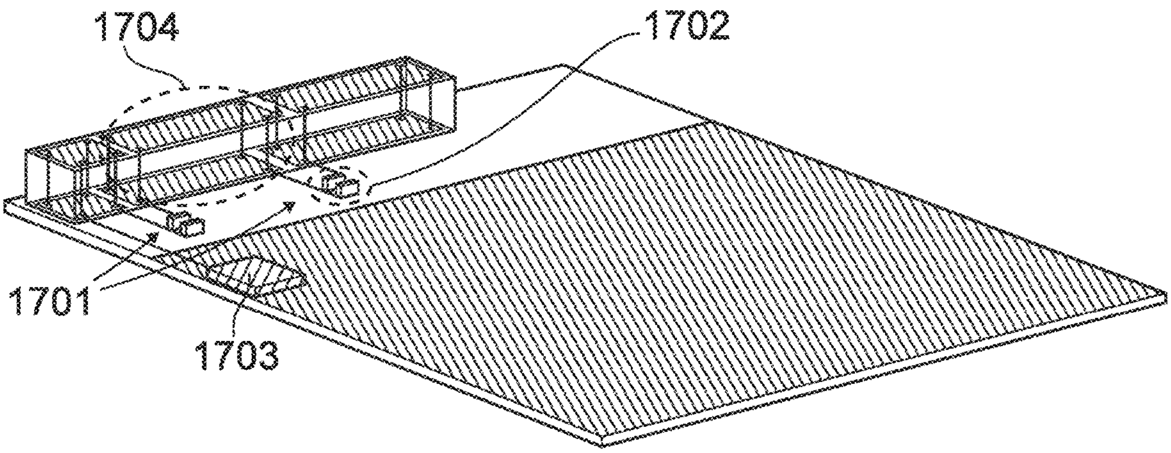
FIG. 17 shows another single-port embodiment that contains an antenna system comprising a single multi-section antenna component containing three sections blocks connected between them by two components circuits.

In some embodiments, as for example the ones provided in FIG. 15 and FIG. 17, the different sections, or more specifically sections blocks in the mentioned examples, comprised in the antenna component contained in the antenna system used, which includes only one multi-stage or multi-section antenna component, comprising adjacent sections or sections blocks arranged in a single row, are advantageously connected between them. Usually, a connecting element 1501 or 1701, used between sections comprises at least a circuit component 1502 or 1702, passive or active, but other connection elements, like for instance transmission lines, conductive traces, filters, are used in other embodiments. The examples from FIG. 15 and FIG. 17 are single-port solutions that provide operation at multiple frequency bands at the only input/output port 1503, 1703 comprised in the solution, covering for instance frequency regions like 698 MHz-960 MHz and 1710 MHZ-2690 MHz. In single-port embodiments comprising an antenna system that comprises only one multi-stage antenna component including two sections blocks, or sections blocks like in the one shown in FIG. 15, normally a first section block 1504 is configured for operating at HFR, usually from 1710 MHz to 2690 MHz, while the second section block 1505 contributes to LFR operation, usually configured for operating between 698 MHz and 960 MHz. In a single-port configuration like the one shown in FIG. 15, where the two sections blocks comprised in the antenna component are inter-connected, the HFR section also contributes to the LFR operation of the device. The two sections blocks are advantageously connected between them in some embodiments, by a notch LC filter, which presents a high impedance at those frequencies of the high frequency region (HFR) and small impedance values at the low frequency region (LFR).

Figure 18:
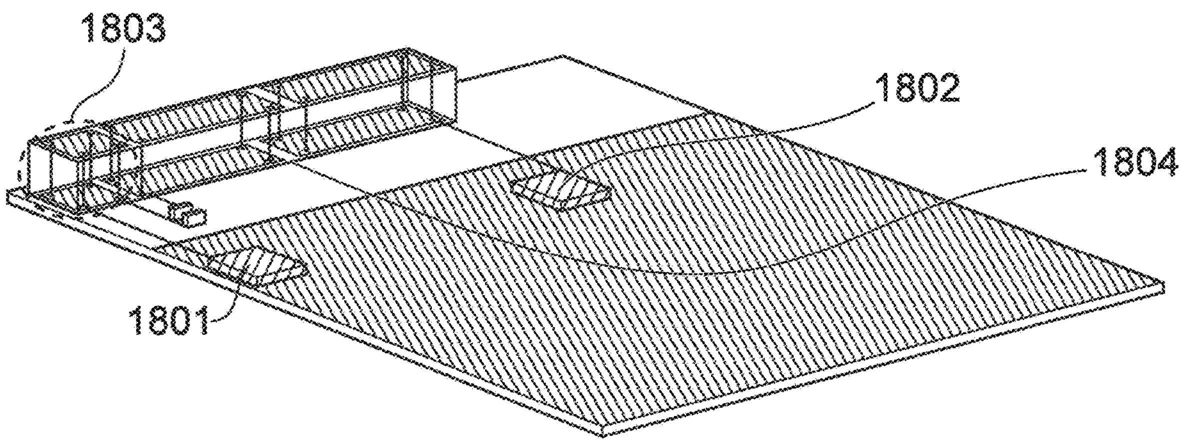
FIG. 18 illustrates a multi-port solution comprising two ports and an antenna system containing one antenna component comprising three sections blocks, two of them connected between them by a components circuit.
Figure 19:
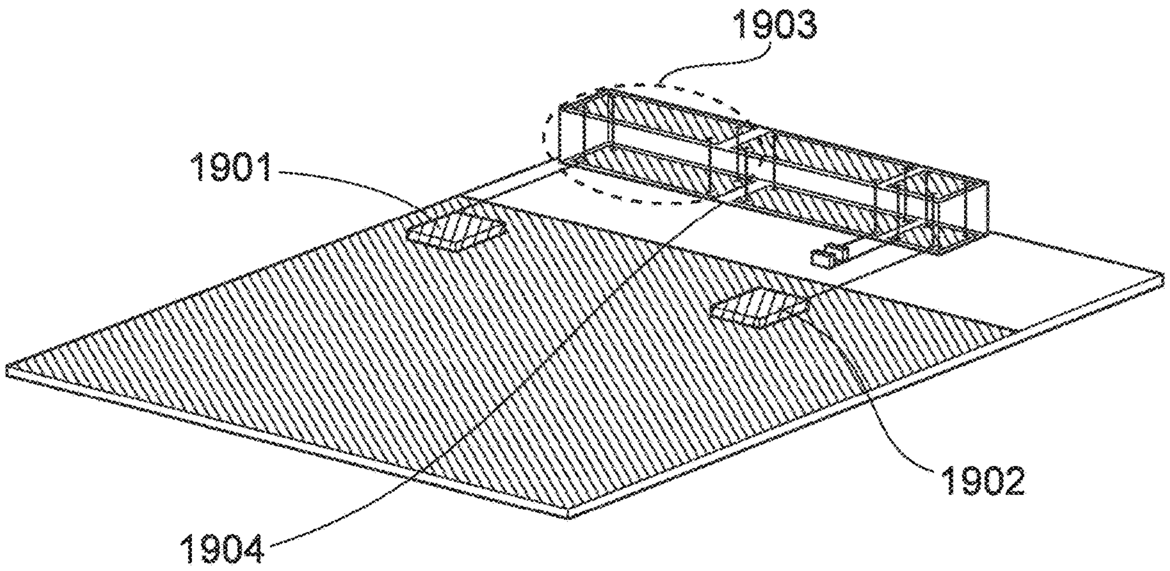
FIG. 19 illustrates a multi-port solution comprising two ports and an antenna system containing one antenna component comprising three sections blocks, two of them connected between them by a components circuit.

Other embodiments of a wireless device related to the present invention include more than one port. Some of those multi-port embodiments comprise an antenna system comprising at least one antenna component including at least two sections, arranged in a same layer, or sections blocks electrically-connected between them. With the purpose of providing two illustrative examples, FIG. 18 and FIG. 19 show two embodiments that include two ports each 1801, 1802 and 1901, 1902 and that comprise an antenna system including one antenna component that contains three sections blocks, like element 1803 or 1903 shown in FIG. 18 and FIG. 19 respectively, wherein two of the sections are connected between them by at least one circuit component, usually comprised in a filter circuit. An open circuit 1804, 1904 fulfills the gap between the other two sections, so that there is no electrical connection between them. These embodiments are configured, for instance, in some cases, for covering operation at mobile communications at one port and at least at GNSS and/or Bluetooth and/or Wifi (2.4 GHZ Wifi and/or 5 GHZ Wifi) at the other port. In other cases, one port provides operation at mobile communications, covering for example LTE700, GSM850, GSM900, LTE1700, GSM1800, GSM1900, UMTS2100, LTE2300, LTE2500 and LTE2600 standards, and the other port at GPS communications.

Figure 20:
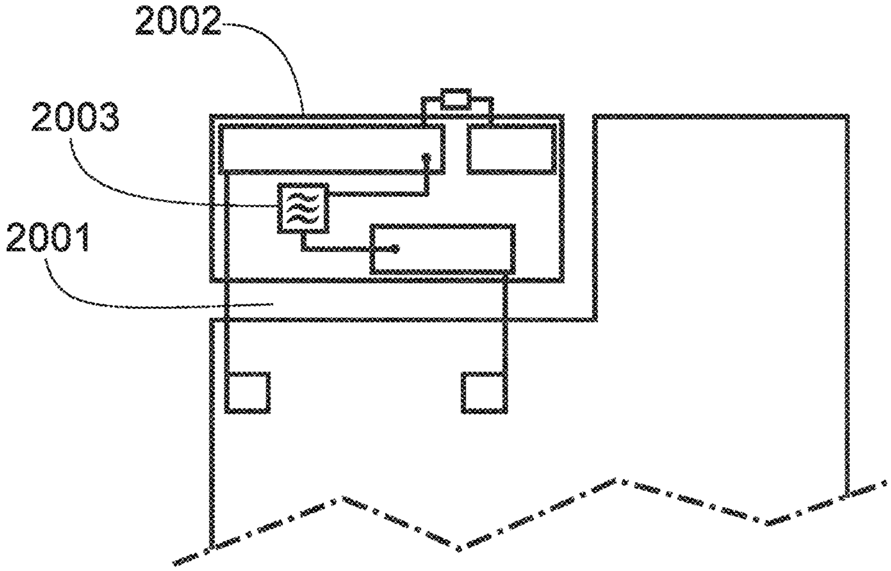
FIG. 20 provides an example of a radiating system related to the present invention featuring a reduced ground plane clearance that allocates an antenna system featuring a non-linear arrangement.

Other embodiments of a radiating system included in a wireless device related to the present invention feature a reduced ground plane clearance 2001 where the modular antenna system 2002 is advantageously integrated, as shown in the example from FIG. 20. The ground plane clearance corresponds to the available space in the PCB comprised in the radiating system free of ground plane. An antenna system integrated in a ground plane clearance of reduced dimensions features an arrangement also occupying a minimized space, typically featuring a non-linear arrangement so that the antenna system fits in the available space. An antenna system non-linearly arranged, like the one shown in FIG. 20, is also advantageous for interconnecting the different antenna components between them, as already illustrated in FIG. 20, with element 2003.

Other embodiments of a radiating system containing a multi-stage antenna system related to the present invention provide simultaneous operation in at least one common frequency range at more than one input/output port. Those embodiments advantageously comprise at least one isolation bridge, the isolation bridge being a connection between at least two sections comprised in a multi-section antenna component included in the antenna system, or a connection between two or more antenna components comprised in the antenna system, the isolation bridge externally connected to the multi-stage antenna component or antenna system structure. The isolation bridge connection allows to isolate or to decouple the ports included in the radiating system. Since an isolation bridge related to the present invention is an external element added to the antenna component or antenna system structure, the antenna and radiating systems related to this invention that provide simultaneous operation at different ports are flexible systems able to admit different configurations for achieving the sought isolation characteristics, contrary to current systems found in prior-art that include a fix decoupling element or system in their antenna system structure (U.S. Pat. No. 8,547,289 B2). An isolation bridge related to the present invention comprises at least a conductor element, typically being a conductive trace or strip in some embodiments, but not limited to those elements. Additionally, in some embodiments, the isolation bridge further comprises a reactive component, like a capacitor or an inductor for example, or further comprises in other embodiments a combination of reactive components arranged in parallel and/or in series, or even further includes a resistance in other embodiments. In other examples, the isolation bridge additionally includes a smart tuner, containing at least one active or variable circuit component. The embodiments including an isolation bridge or bridges comprising a fix configuration of elements provide an isolation between ports adjusted to a fix frequency band or bands. Advantageously, the embodiments containing an isolation bridge that includes a smart tuner are able to tune the isolation functionality to a required frequency band or bands, providing a more flexible antenna and radiating systems able to provide simultaneous operation at more than one port. So, a multi-stage antenna system according to the present invention can also be integrated, for instance in MIMO devices, and more generally, in wireless devices that provide performance diversity.

Figure 21:
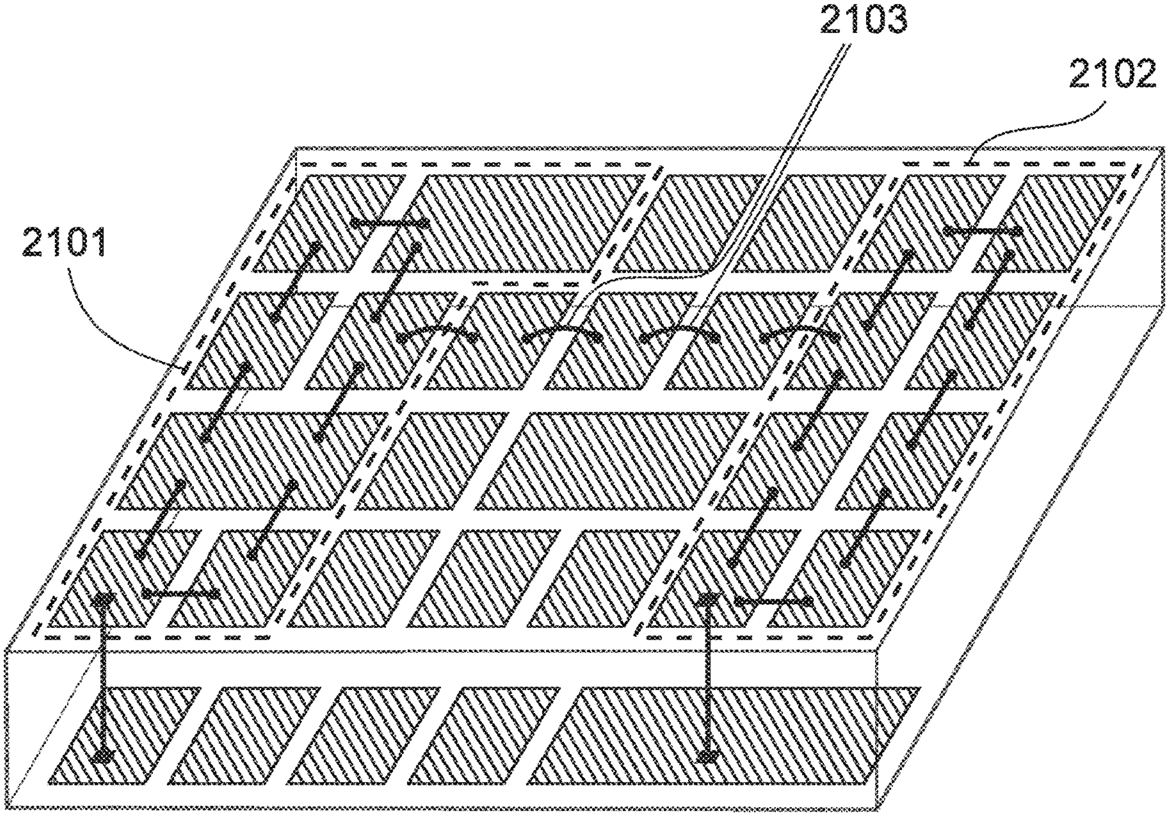
FIG. 21 presents a multi-section antenna component mounted in a two-layers support featuring a sections matrix arrangement configured for providing MIMO operation.

An illustrative example of a multi-section antenna component mounted in a two-layers support, each layer comprising more than one section arranged in a matrix layout, configured for providing MIMO operation is presented in FIG. 21. Some sections are interconnected between them, creating two sections groups 2101 and 2102, as shown in FIG. 21, each sections group connected to a port, in this case all the ports configured for operating at the same frequency bands. Additionally, the two mentioned sections groups, shown in FIG. 21, are connected between them by at least one isolation bridge 2103, the isolation bridge advantageously being a smart tuner. As described before, the isolation bridge allows the radiating system to provide MIMO operation, allowing coverage in the same frequency bands at the multiple ports included in the device.

Figure 22:
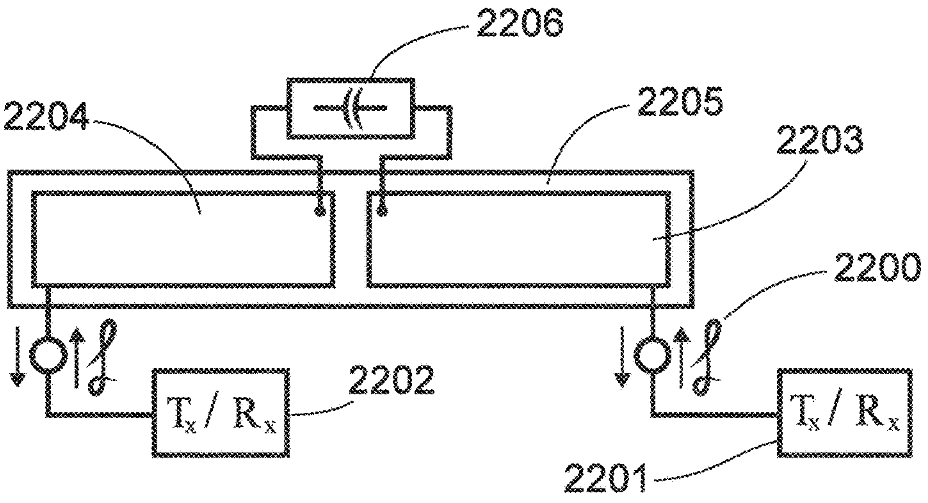
FIG. 22 provides a MIMO antenna system according to the present invention comprising two sections linearly arranged and connected by an isolation bridge element, as described herein.

An embodiment of a multi-section antenna component, more specifically a two-sections antenna component with a linear arrangement, comprised in a modular antenna system related to the present invention included in the radiating system of a wireless device that provides simultaneous operation in at least one common frequency range at more than one ports is provided in FIG. 22. The antenna component is comprised in an antenna system included in a radiating system that comprises two ports 2201, 2202, each port connected to one section, comprising one conductive element each 2203, 2204, comprised in the antenna component 2205, the sections connected by an isolation bridge, as shown by element 2206. In this example, each conductive element and section contributes to the operation of each port, both ports operating at the same frequency range 2200, the ports decoupled by the isolation bridge element, which connects externally both sections.

Figure 23:
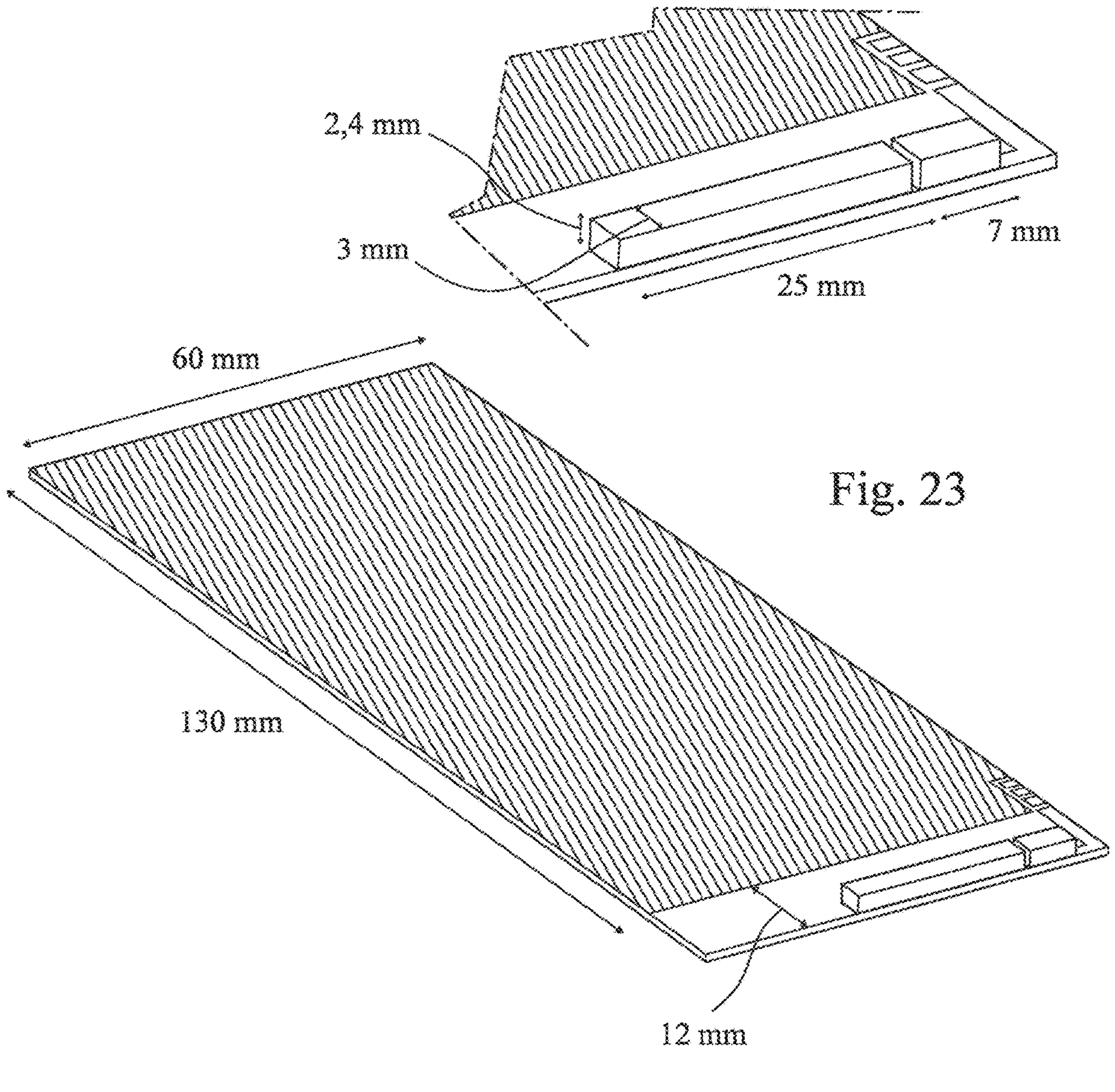
FIG. 23 shows a single-port radiating structure comprising an antenna system that contains a multi-section antenna component comprising two sections of different sizes supported on a dielectric-material piece of height 2.4 mm.

An embodiment of a radiating system included in a wireless device related to this invention including an antenna system that comprises an antenna component including two sections, is provided in FIG. 23. The radiating system includes an antenna system comprising one multi-section antenna component, the antenna system mounted on one single piece and the antenna component containing two sections comprising two conductive hexahedrons featuring rectangular faces featuring a length of 25 mm and 7 mm and a width of 3 mm. The conductive hexahedrons are spaced by an air gap of 0.5 mm in this example. The antenna component is supported by a dielectric-material piece featuring a height or thickness of 2.4 mm, which corresponds to the free-space wavelength related to the lowest frequency of operation of the device over 179.1 The solution contains a ground plane layer of dimensions 130 mm×60 mm placed at 9 mm distance from the antenna system comprising the antenna component.

Figure 24:
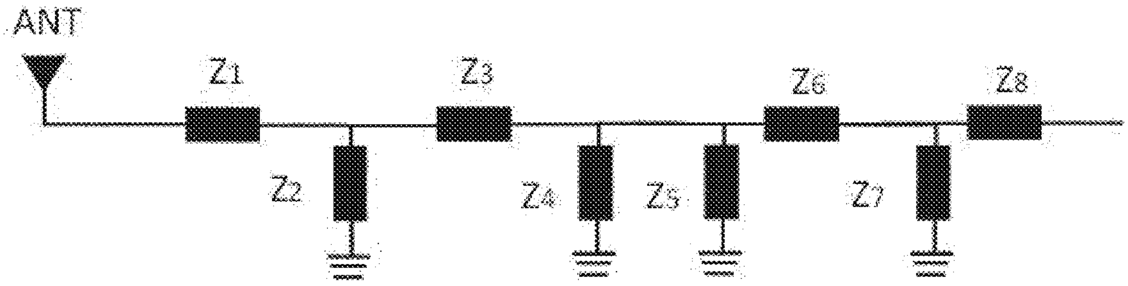
FIG. 24 provides one matching network used for matching the embodiment shown in FIG. 23. The two sections are connected in this case between them by an inductor. The part numbers of the components used are included in the Figure.

FIG. 24 provides an example of matching network used for matching the embodiment provided in FIG. 23. FIG. 24 shows the topology and provides the part numbers of the components used in this particular matching example. The component value that corresponds to each part number is highlighted in bold letters in the part numbers in FIG. 24. For example, Z1 component is an inductor of 2.2 nH and Z3 or Z4 are capacitors of values 1.8 pF and 0.5 pF respectively. The sections included in the antenna component contained in the antenna system illustrated and described in FIG. 23 are connected by an inductor, whose value is also included in FIG. 24 by providing its part number-LQW18 AN18 NG80-, which corresponds to a value of 18 nH.

Figure 25:
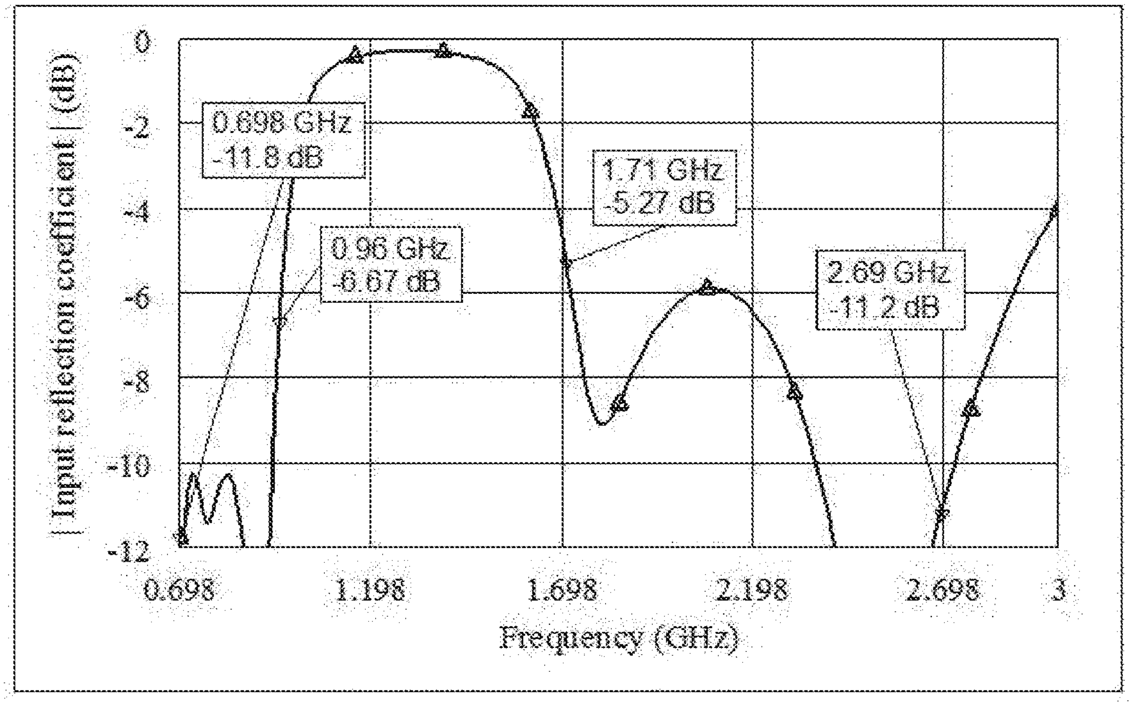
FIG. 25 shows the input reflection coefficient related to the embodiment provided in FIG. 23 matched with the matching network from FIG. 24.

FIG. 25 illustrates the input reflection coefficient related to the embodiment provided in FIG. 23 when the sections contained in the antenna component comprised in the antenna system included in the embodiment are connected by an inductor and matched with a matching network like the one shown in FIG. 24. Some markers are included in FIG. 25 indicating the frequency bands of interest of this solution, meaning from 698 MHz to 960 MHz and from 1710 MHz to 2690 MHz. Very good input reflection coefficient values are obtained in the frequency ranges.

Figure 26:
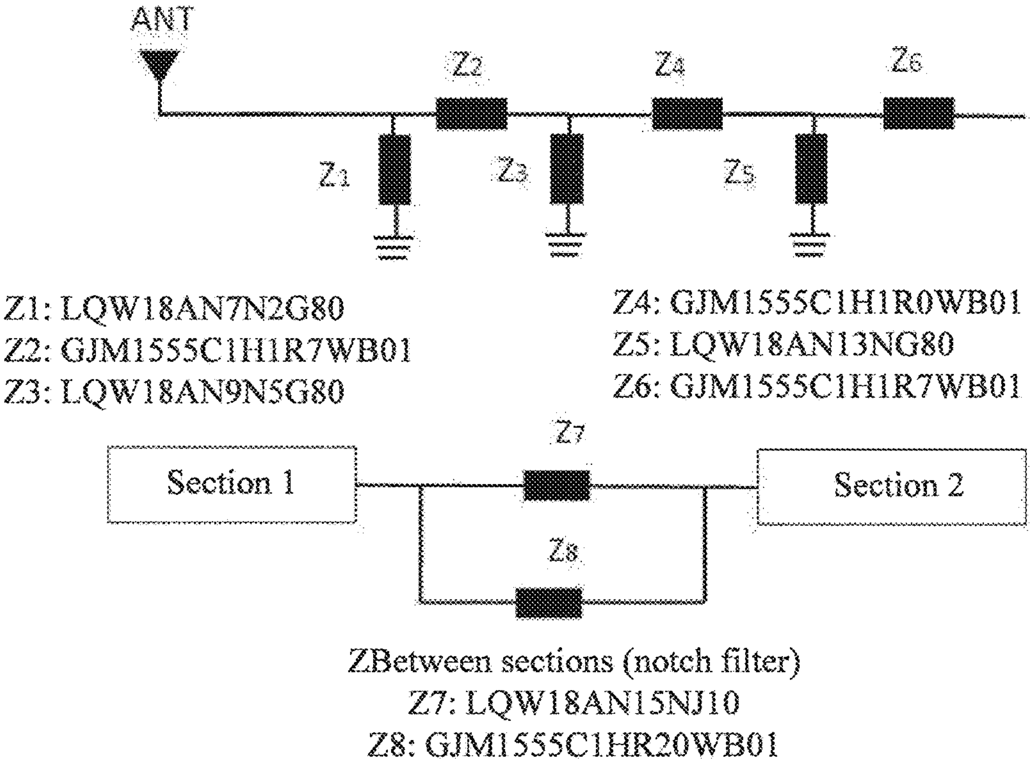
FIG. 26 provides a matching network also used for matching the embodiment shown in FIG. 23 when a notch filter connects the two sections comprised in the multi-section antenna component. The part numbers of the components used in the matching network and filter are also included in the Figure.
Figure 27:
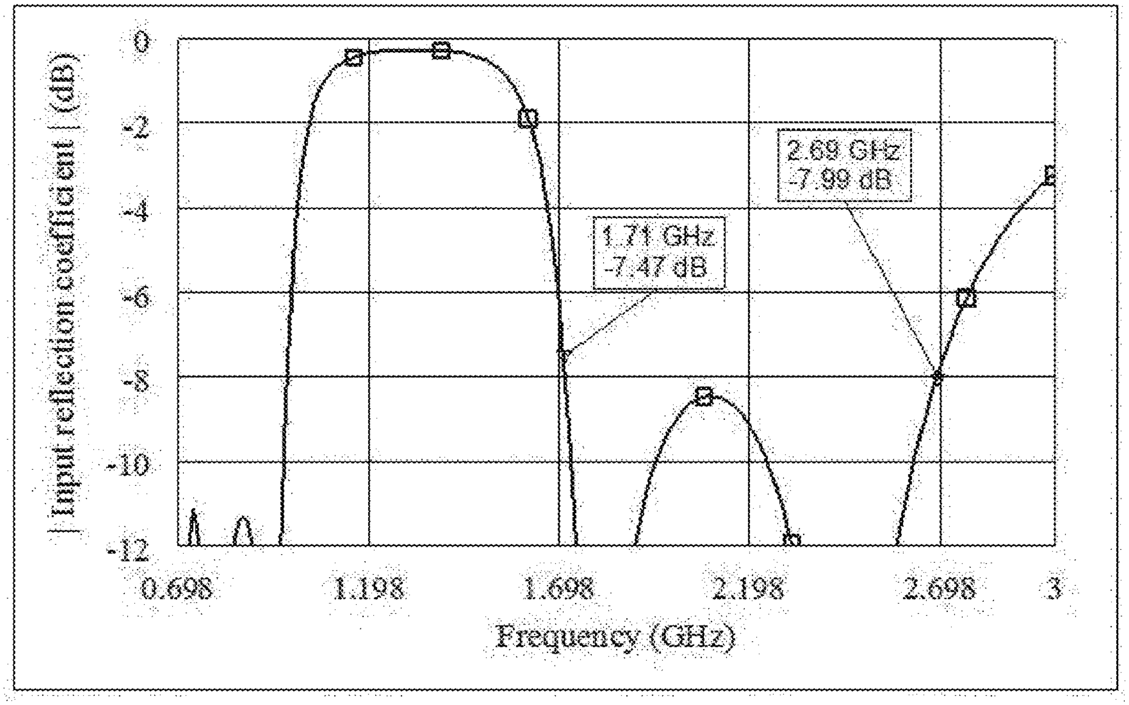
FIG. 27 shows the input reflection coefficient related to the embodiment provided in FIG. 23 when matched with the matching network and filter provided in FIG. 26.

Another example of matching network used for matching the embodiment from FIG. 23 is provided in FIG. 26. This matching network is used in combination with a notch filter, more concretely the one provided in FIG. 26. The notch filter comprises an inductor and a capacitor connected in parallel between them and to the antenna component sections as illustrated in the filter schematic shown in FIG. 26. The notch filter blocks the high-frequency waves to travel through the 7 mm section to the 25 mm section. The part numbers of the components used for implementing both the matching network and the filter are also included. The input reflection coefficient obtained with such matching configuration, characterized by the use of the notch filter connecting the two sections comprised in the antenna component included in the antenna system shown in FIG. 23, is provided in FIG. 27. The embodiment matching performance, which is here characterized by the input reflection coefficient, is improved with respect to the matching performance obtained with the matching configuration provided in FIG. 24 and provided in FIG. 25. Such performance improvement is clearly evidenced when comparing FIG. 25 to FIG. 27.

Figure 28:
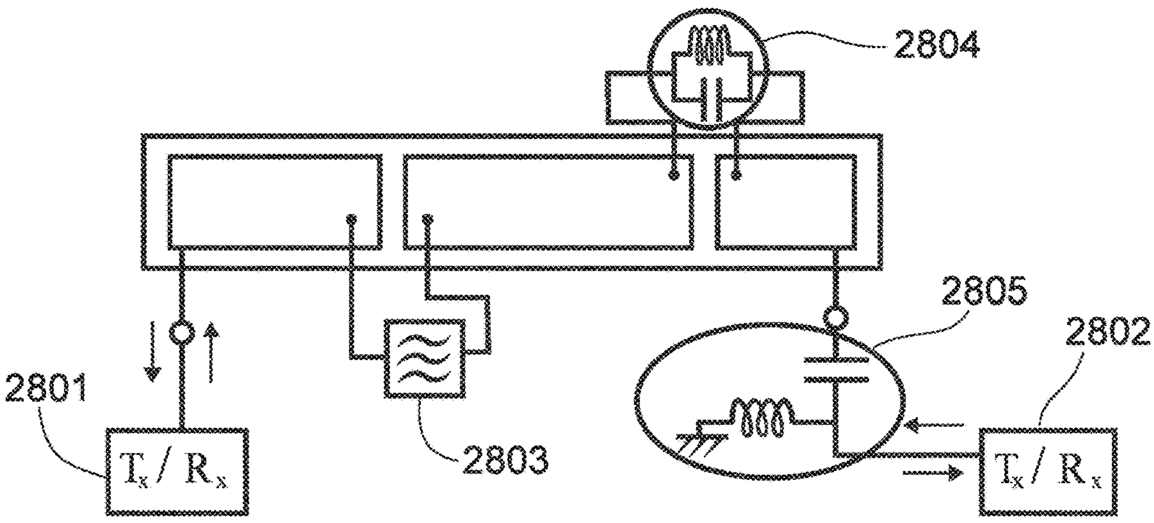
FIG. 28 shows an antenna component comprising three conductive elements per layer, configured for operating at different communication standards at two different ports, by including different filters between conductive elements of different sections.

An embodiment of a two-layers multi-section antenna component comprising three sections per layer, each section including one conductive element, is provided in FIG. 28. The conductive elements and sections included in each layer are arranged describing a same pattern. This particular embodiment comprises two ports, 2801 and 2802, port 2801 operating at mobile bands covering from 698 MHz to 2690 MHz, and port 2802 operating at Bluetooth and Wifi communications, which cover 2.4-2.5 GHz frequency range, as well as GPS communications covering operation at 1.6 GHz. The embodiment is configured so that the two first sections and/or conductive elements are connected by a HFR filter, element 2803, filtering high frequencies beyond 1.5 GHz, and the two last sections, near port 2802, are connected by a filter, represented with element 2804, that blocks Bluetooth and Wifi frequencies. Finally, a bandpass filter 2805 is included at port 2802 for stopping low-band mobile frequencies below 1 GHz and high-band mobile frequencies beyond 2 GHz for example. More specifically, the filters comprise reactive circuit components like a capacitor and an inductor. With such an embodiment configuration, the three sections comprised in the antenna component contribute to operation at low mobile frequencies, operative at port 2801, mainly the two first sections contribute to high mobile frequencies, and the two last sections to operation at Bluetooth, Wifi and GPS, available at port 2802.

Figure 29:
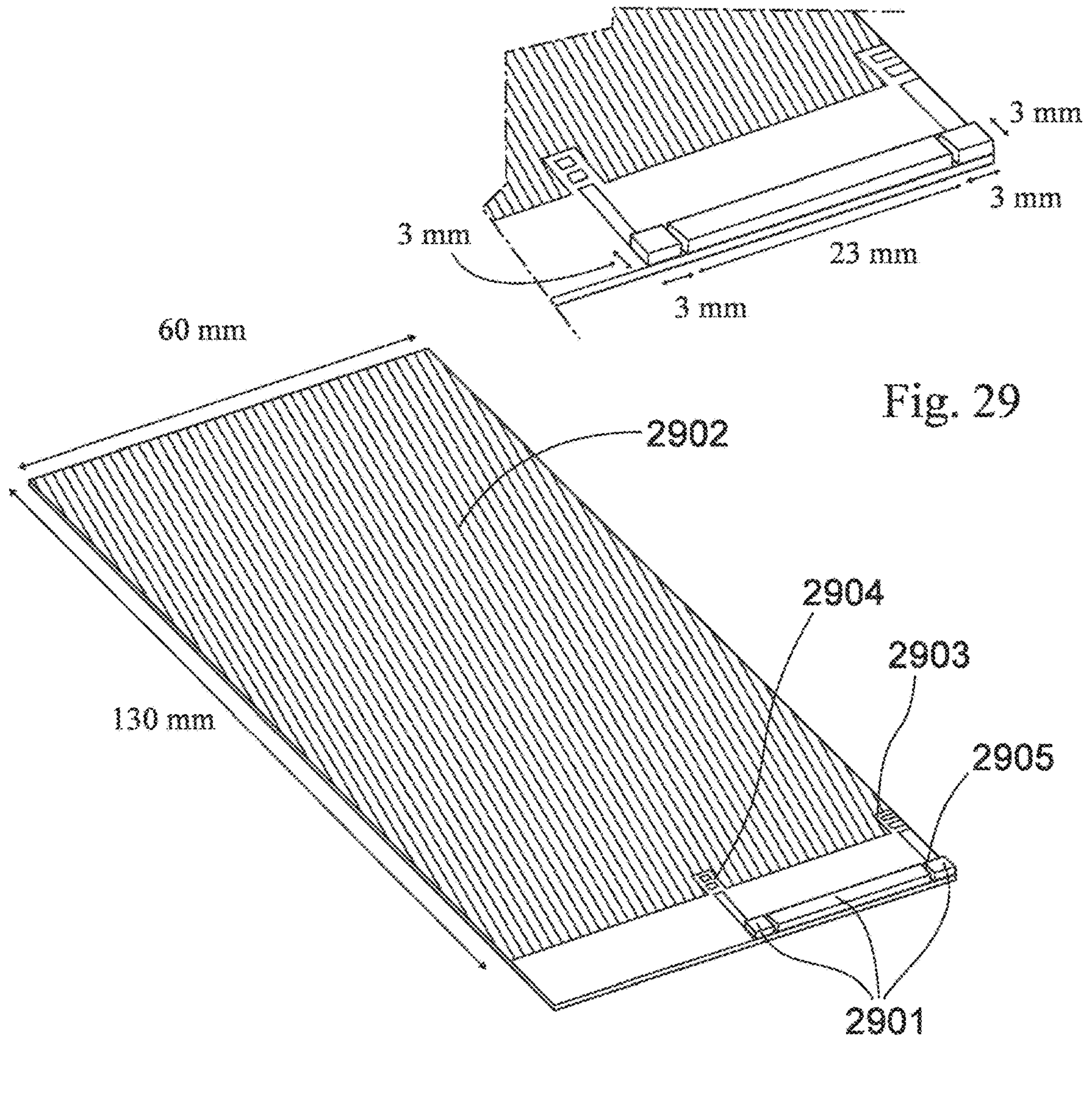
FIG. 29 provides a dual-port radiating structure comprising an antenna system that contains a multi-section antenna component comprising three sections supported on a dielectric-material piece of thickness 1 mm.

Another embodiment of a radiating structure related to the present invention is presented in FIG. 29 that includes an antenna system comprising one multi-section antenna component comprising three sections 2901. The antenna system is also mounted on a single piece providing a reduced-cost antenna system. In this particular embodiment, the antenna component contains three conductive hexahedrons featuring rectangular faces, the conductive volumes featuring 1 mm thickness and the length and width dimensions included in FIG. 29. The thickness corresponds to 1/429.8 times the free-space wavelength corresponding to the lowest frequency of operation of the radiating structure or the wireless device including it. In this particular example, two air gaps of 0.5 mm space the three conductive elements between them, forming an antenna component and antenna system featuring 30 mm length. The gap features a value in the range 0.5 mm to 3 mm in other embodiments of an antenna component featuring the characteristics of the one described in this particular example. So, this antenna system is a thin and an elongated structure that can be easily allocated in small spaces reserved within a low-profile wireless device for integrating the antenna system. A ground plane layer 2902, in this embodiment of dimensions 130 mm×60 mm, is included in the radiating system contained in the embodiment and two ports 2903, 2904 are connected to two of the three conductive elements comprised in the antenna component sections, more specifically to one conductive element each.

Figure 30:
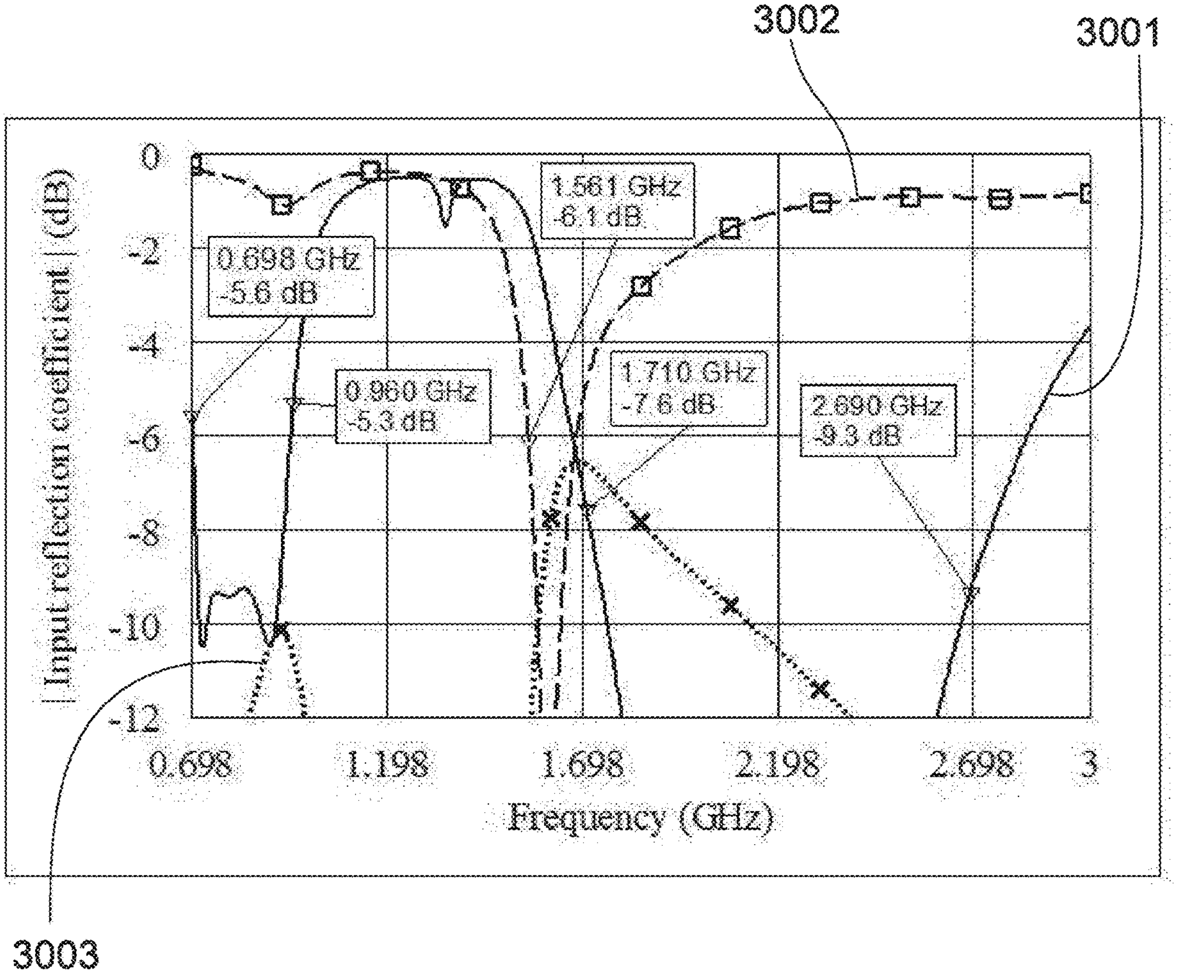
FIG. 30 shows the input reflection coefficient related to each port comprised in the dual-port embodiment provided in FIG. 29. The transmission coefficient between ports is also included.
Figure 31:
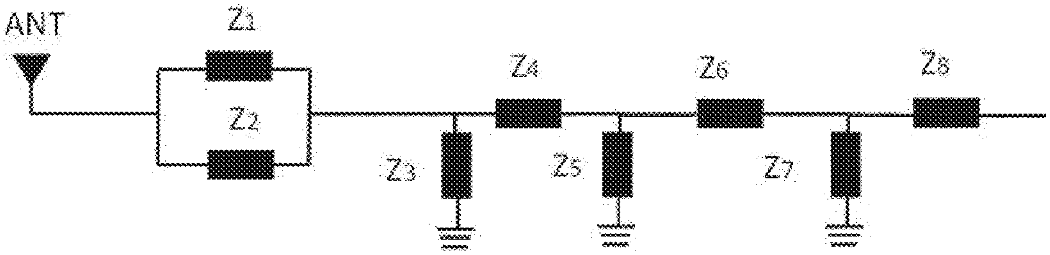
FIG. 31 provides the matching networks used for matching each port comprised in the dual-port embodiment from FIG. 29, as well as the notch filter topology included between two of the sections comprised in the antenna component included in the embodiment.
Figure 31:
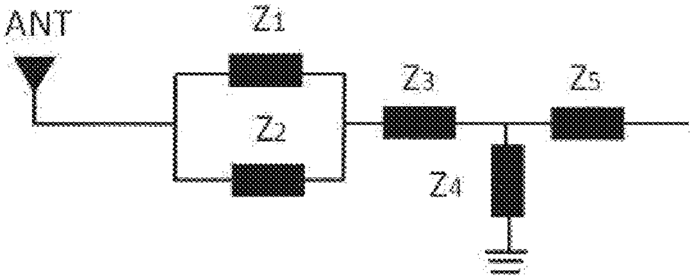
Figure 31:
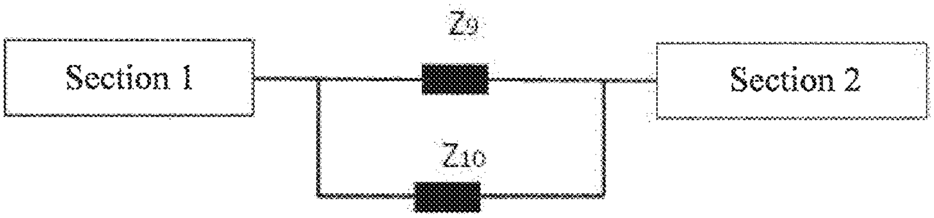

The input reflection coefficient related to each port comprised in the embodiment presented in FIG. 29, when it includes the matching networks from FIG. 31, is illustrated in FIG. 30. Curve (3001), represented by a solid line, corresponds to the input reflection coefficient related to port 2903 and curve (3002), represented by a dashed line, corresponds to the input reflection coefficient related to port 2904. Port 2903 has been configured to provide operation at mobile communications covering both LFR range 698 MHz-960 MHz and HFR range 1710 MHZ-2690 MHz, while port 2904 has been configured for providing operation at GNSS communications, covering the frequency range 1561 MHz-1606 MHz. The transmission coefficient (3003) between two ports is also included in FIG. 30. The ports are well isolated in the aforementioned bands of interest.

Examples of matching networks used for matching the radiating structure embodiment described in FIG. 29 are provided in FIG. 31. Firstly, a matching network used for providing operation at mobile communications at port 2903 is presented. Secondly, a matching network used for providing operation at GNSS communications at port 2904 is shown. A notch filter is included at the end of FIG. 31, the filter including an inductor and a capacitor disposed in parallel between them, connecting the two first sections as shown in FIG. 29 by element 2905. The gap between the middle section and the one connected to the GNSS port (2904) remains open circuit for this particular configuration example, meaning that the sections are not connected between them, as seen in FIG. 29. The part numbers corresponding to the components used in these matching networks examples are also specified in FIG. 31. The values of the components are highlighted in bold letters in the part numbers terminology.

Figure 32:
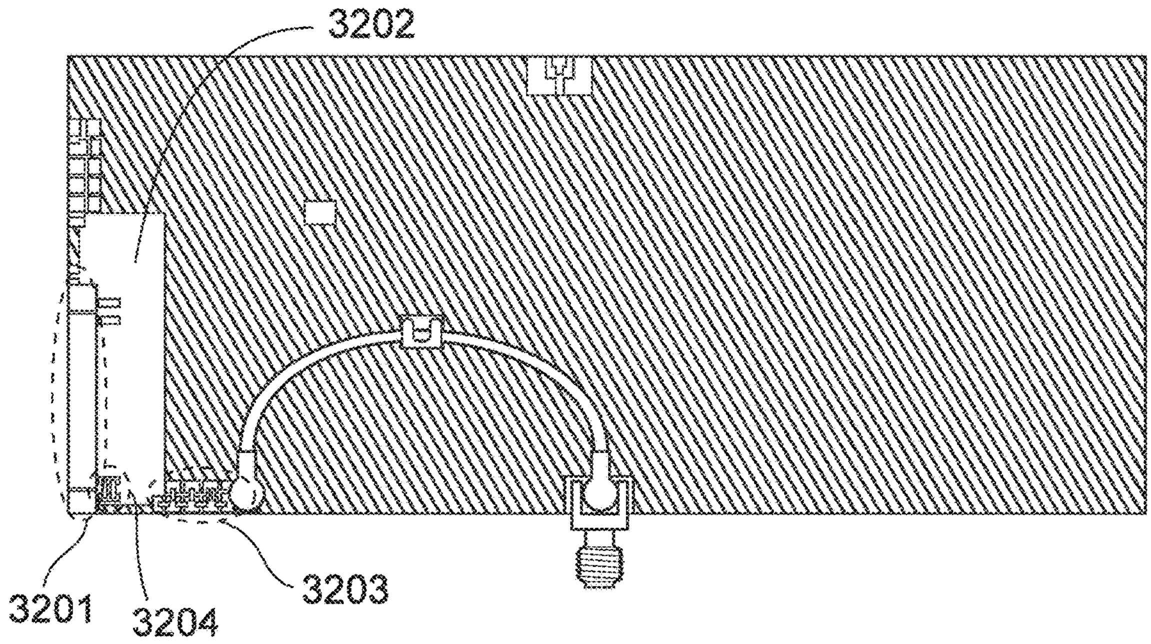
FIG. 32 provides an embodiment of a radiating structure related to the present invention containing a slim elongated antenna component that provides a flexible and slim antenna system solution. The antenna system is allocated in a ground plane clearance of reduced dimensions.
Figure 33:
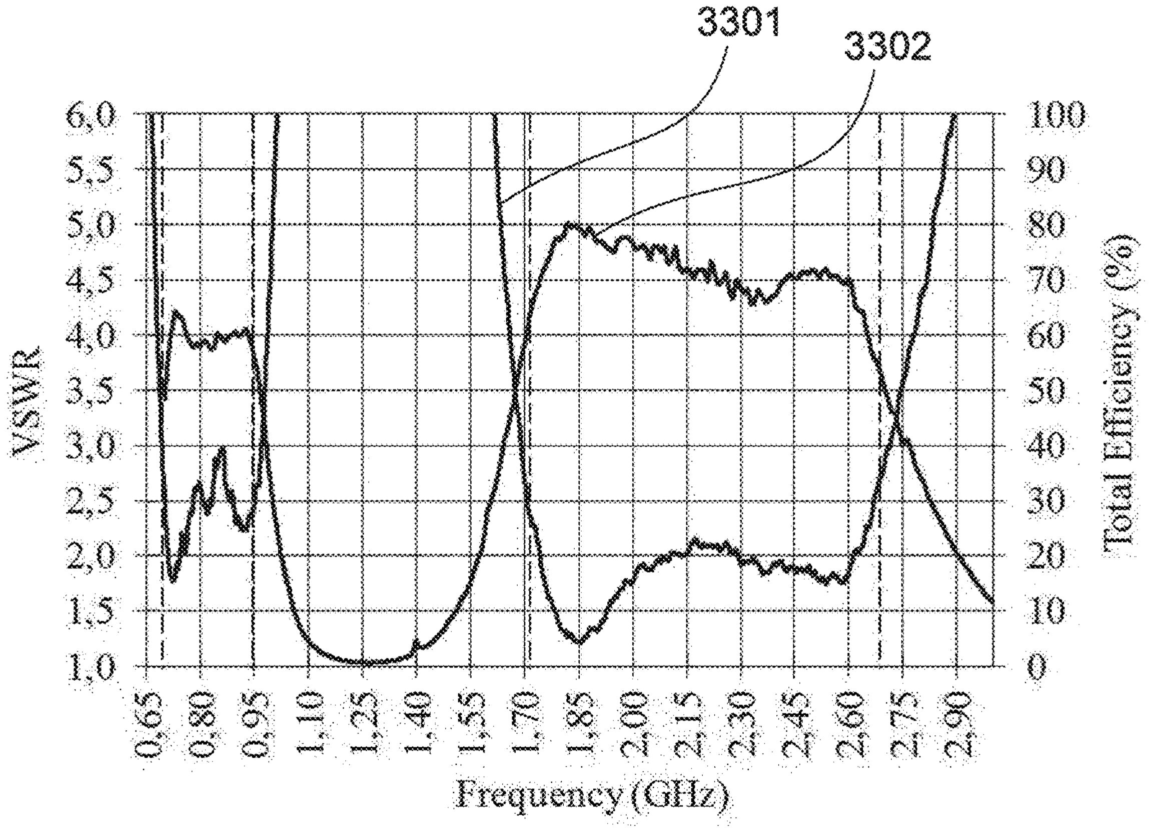
FIG. 33 provides the voltage standing wave ratio and antenna efficiency related to the radiating structure embodiment shown in FIG. 32 when it includes the matching networks provided in FIG. 34.
Figure 34:
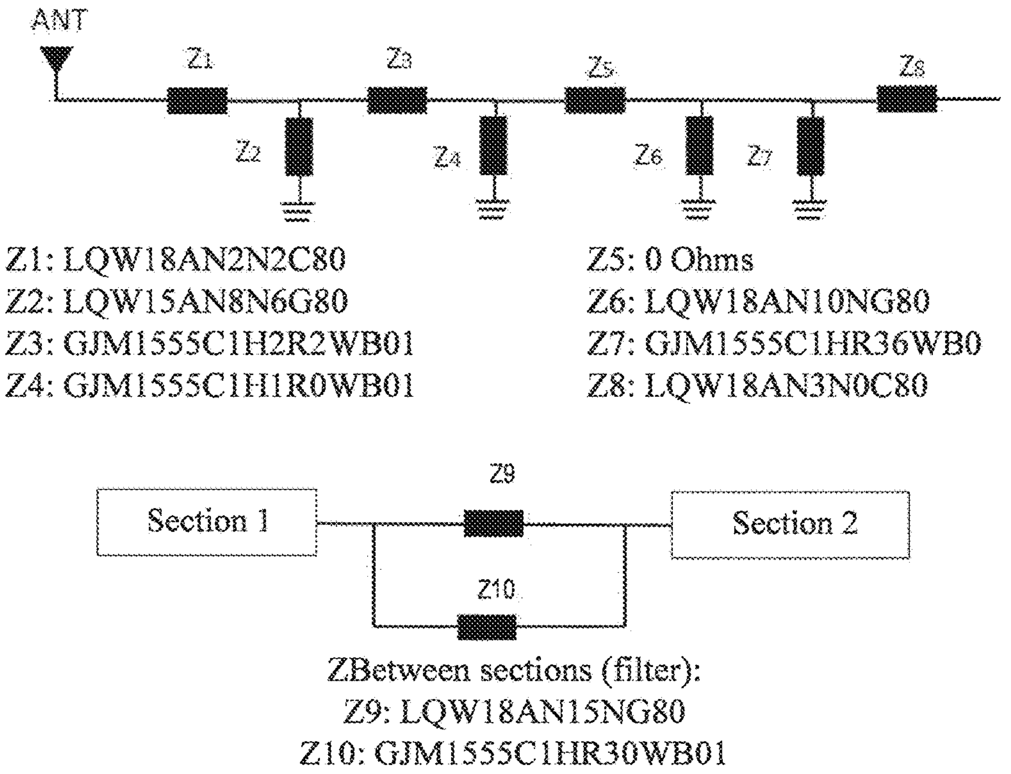
FIG. 34 shows the topology of the matching networks included in the radiating structure provided in FIG. 32, together with the part numbers of the real components used.

FIG. 32 shows an embodiment of a radiating system comprised in a wireless device related to the present invention that contains an antenna system related to this invention including only one multi-section antenna component 3201 mounted on a two layers dielectric piece of 1 mm thickness, each layer containing three sections comprising a conductive element each and vertically-connected to their corresponding parallel top or bottom conductive element by vias, forming three sections blocks. The dimensions of the sections and sections blocks, and the entire antenna component 3201, are the same as the ones of the antenna component included in the embodiment provided in FIG. 29. As mentioned, the antenna component features 1 mm thickness, which corresponds to 1/429.8 times the free-space wavelength at the lowest frequency of operation (i.e. 698 MHz for this case), providing a thin and simple multi-section antenna component that easily fits on slim wireless devices. The radiating system also includes a 60 mm per 120 mm ground plane layer etched on a PCB, the ground plane layer featuring a reduced clearance area 3202, of dimensions 40 mm per 12 mm, with respect to other solutions, as for example the one provided in FIG. 29 that features a full clearance area. More concretely, this radiating system is a one-port solution comprising a matching network 3203 and a filter 3204 that connects the two first sections contained in the antenna component described before. The filter blocks the high-frequency waves avoiding them to travel from the section connected to the matching network to its consecutive section. The two last successive sections contained in the antenna component are not connected between them. As already mentioned, this solution provided is a one-port solution but the PCB is prepared for allocating two-port solutions. The performance, in terms of input impedance matching and antenna efficiencies, achievable with a solution containing an antenna system like the one provided in FIG. 32 and described before is improved with respect to the ones obtained with other current solutions, found in prior-art as for example CUBE mXTENDTM (FR01-S4-250), particularly at LFR frequencies. More concretely, FIG. 33 provides the voltage standing wave ratio (VSWR) 3301 related to the solution when the embodiment previously described and shown in FIG. 32 is matched with the matching network and filter presented in FIG. 34. FIG. 33 also presents the antenna efficiency 3302 related to this particular solution in the frequency range going from 650 MHz to 3 GHz. The aforementioned radiating system configuration provides operation at LFR and HFR mobile bands, covering from 698 MHz to 960 MHz and from 1.71 GHz to 2.69 GHZ, respectively, as shown in FIG. 33 with grey shadows, featuring antenna efficiency averages in the frequency bands within a range 55%-60% and 65%-75% at LFR band and HER band respectively, more specifically 59% and 71% antenna efficiencies obtained for the embodiment shown in FIG. 32.

Figure 35:
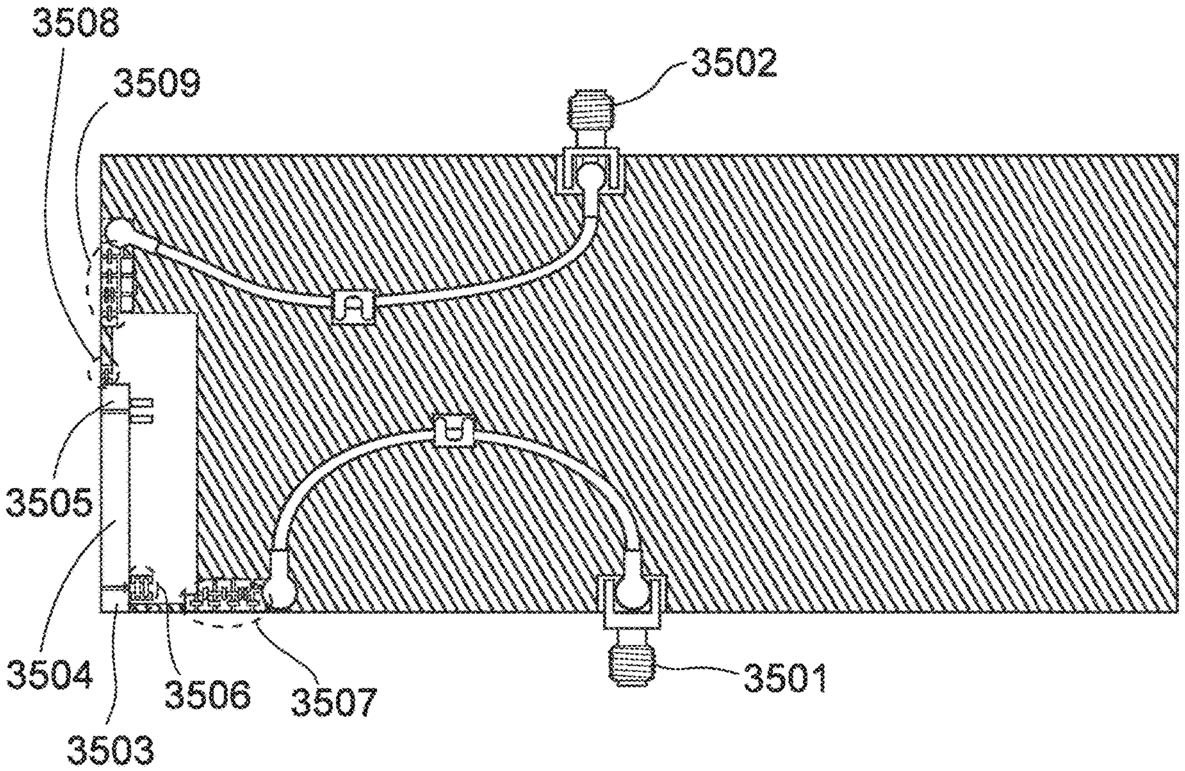
FIG. 35 shows an embodiment of a radiating structure related to the present invention containing the slim elongated antenna component included in the embodiment from FIG. 32, which provides a two-ports embodiment.
Figure 36:
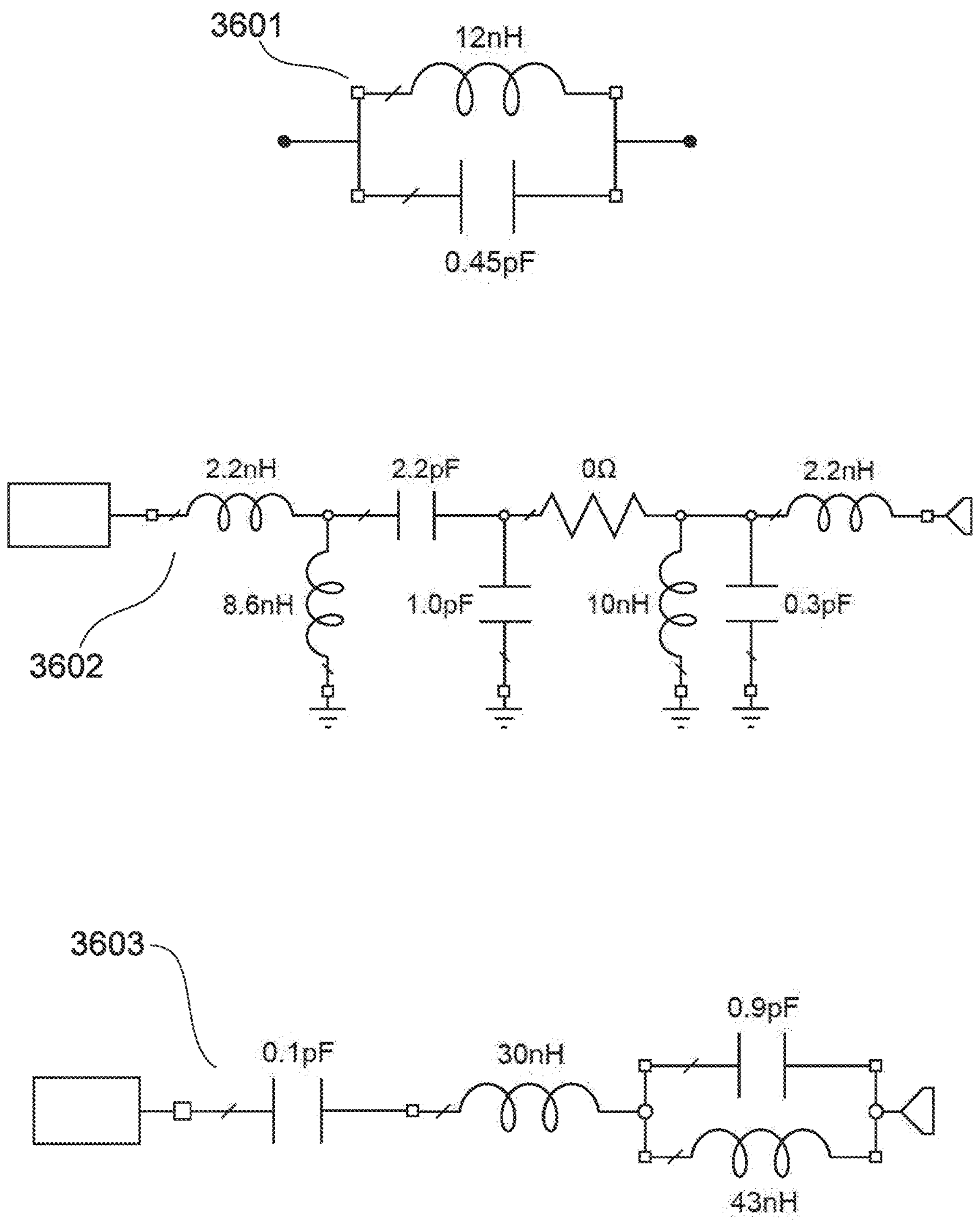
FIG. 36 shows the matching networks 3602 and 3603 used for matching the embodiment from FIG. 35 at the two corresponding ports 3501 and 3502 comprised in this radiating structure and a filter 3601 that connects two sections of the antenna component comprised in the radiating structure embodiment.
Figure 37:
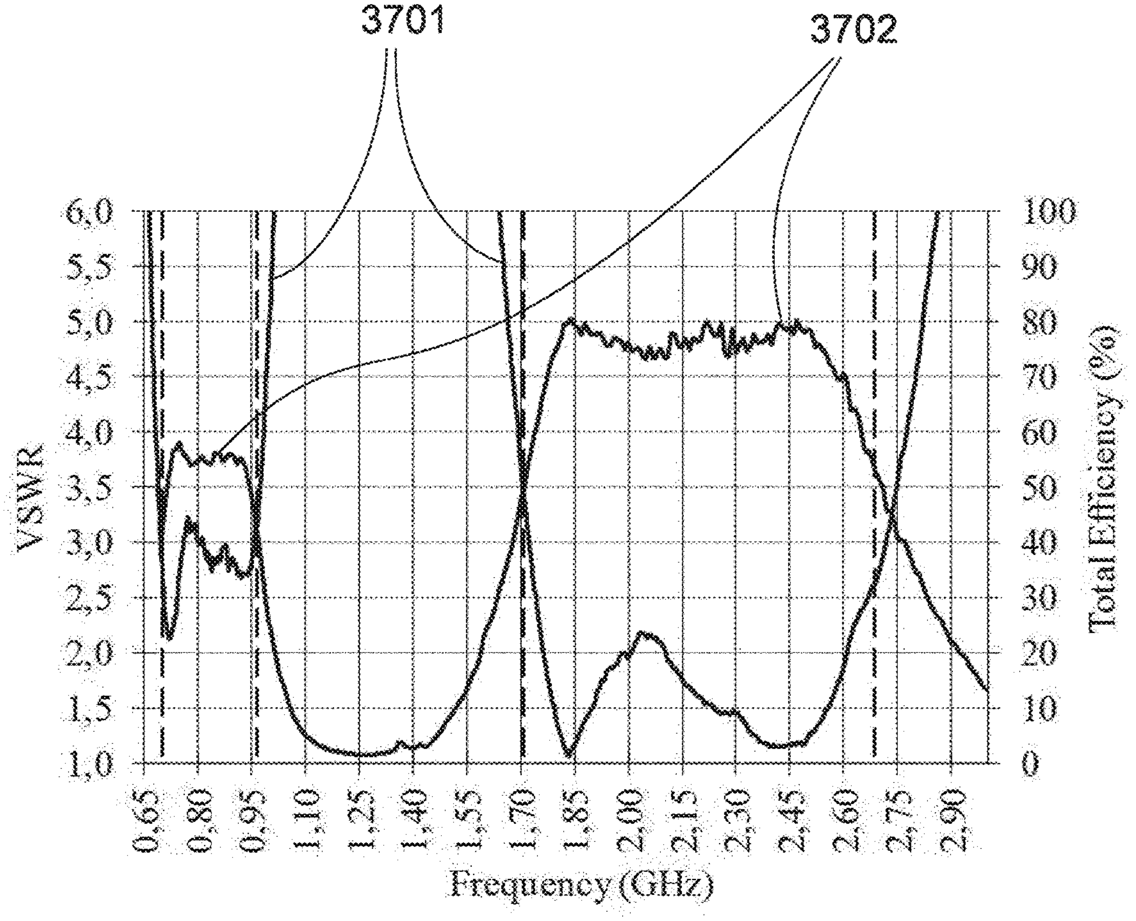
FIG. 37 provides the voltage standing wave ratio and the antenna efficiency related to port 3501 from the radiating structure provided in FIG. 35.
Figure 38:
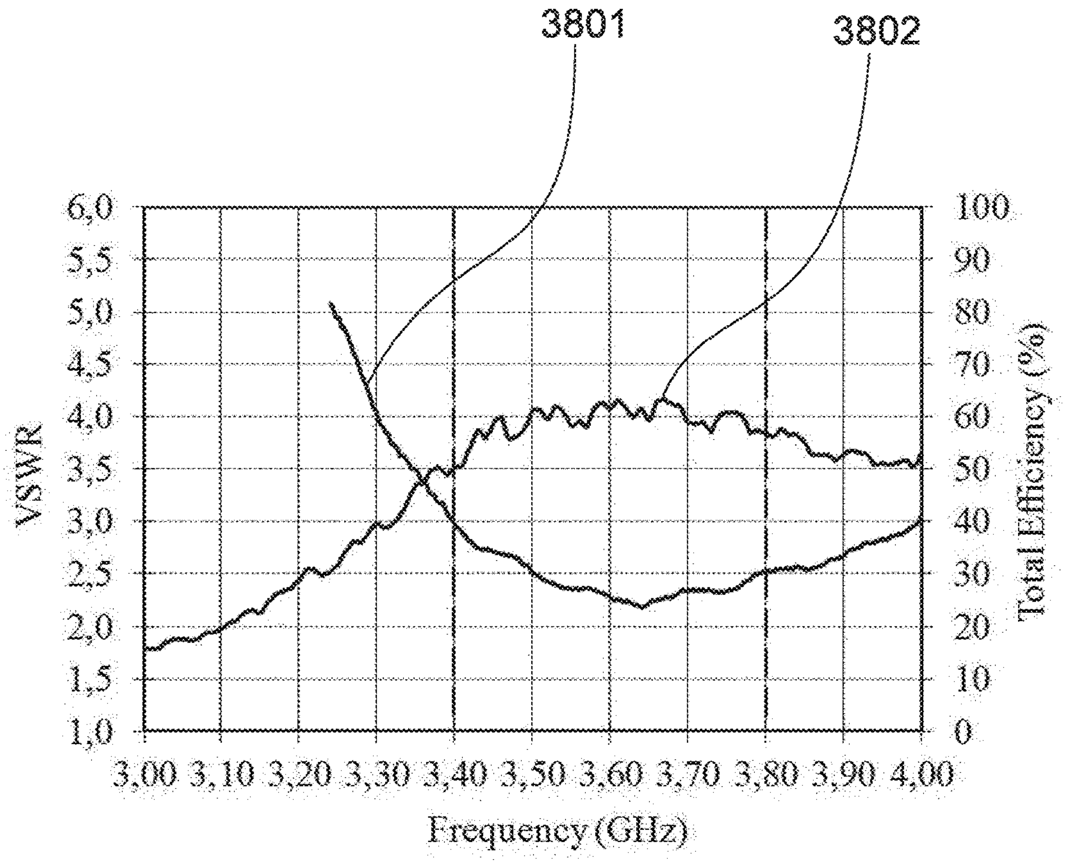
FIG. 38 provides the voltage standing wave ratio and the antenna efficiency related to port 3502 from the radiating structure provided in FIG. 35.

FIG. 35 presents another embodiment of a radiating system related to the present invention, this particular example containing two ports and an antenna system comprising one multi-section antenna component including three sections-blocks, the antenna component also comprised in the previous embodiment provided in FIG. 32 and described above. The PCB that allocates this radiating system is also the same as the one comprised in the previous embodiment, presented in FIG. 32, but the solution provided in FIG. 35 contains two ports, as already mentioned. This embodiment is a clear example of the flexibility that characterizes both an antenna system related to the present invention and an antenna component comprised in the antenna system, meaning that a radiating system structure according to this invention can be configured in different ways for covering different communication bands and standards to obtain different device functionalities. Particularly, the embodiment presented in FIG. 35 covers operation at 3G/4G and 5G mobile communication standards, wherein port 1 (3501) covers 3G and 4G mobile bands going from 698 MHz to 960 MHz and from 1.71 GHz to 2.69 GHz and port 2 (3502) covers 5G mobile bands going from 3.4 GHz to 3.8 GHz. For this particular example, the thickness of the antenna component included in the radiating system described is 1/429.8 times the free-space wavelength at 698 MHz. Sections 3503 and 3504 are electrically connected between them by a filter 3601, corresponding to element 3506 in FIG. 35, containing the circuit components provided in FIG. 36 and arranged in the configuration shown in the Figure, while sections 3504 and 3505 are not electrically connected between them. In this particular embodiment, port 3501 is matched with the matching network 3602, which corresponds to element 3507, and port 3502 is matched with the matching network 3603, which corresponds to elements 3508 and 3509 from FIG. 35. Element 3508 corresponds to a low-capacity capacitor, more specifically to a 0.1 pF capacitor, that blocks low frequencies to travel through the second feeding system included in the embodiment and related to port 3502. The matching network topologies and antenna component configuration provide the Voltage Standing Wave Ratios (VSWR) 3701 and 3801 and efficiencies 3702 and 3802 shown in FIG. 37 and FIG. 38, in 3G and 4G bands and in 5G band, respectively. The antenna efficiency average provided by this embodiment, shown in FIG. 35, is higher than 50% in 698 MHZ to 960 MHz band, higher than 70% in the 1.71 GHz to 2.69 GHz band and higher than 55% in the 3.4 GHz to 3.8 GHz band.

Other radiating system embodiments that contain the antenna component included in the embodiments from FIG. 32 and FIG. 35 are configured to operate at mobile bands comprising at least the frequency ranges 824 MHz to 960 MHz and 1.71 GHz to 2.17 GHz at one port, and at an additional frequency range at another port for providing operation at an additional communication standard, as for example but not limited to GNSS (going from 1561 MHz to 1606 MHz) or Bluetooth (from 2.4 GHz to 2.5 GHZ). Some of those radiating system embodiments are allocated in a PCB like the one comprised in the embodiments provided in FIG. 32 and FIG. 35. The matching networks comprised in the feeding systems included in these embodiments to match the port not working at mobile communications, advantageously comprise a two-stage filter including a low-pass filter and a high-pass filter, so that the filter response is selective enough to achieve a good isolation between ports and consequently a good efficiency performance at both ports of at least 50% of antenna efficiency average at the bands of interest.

Figure 39:
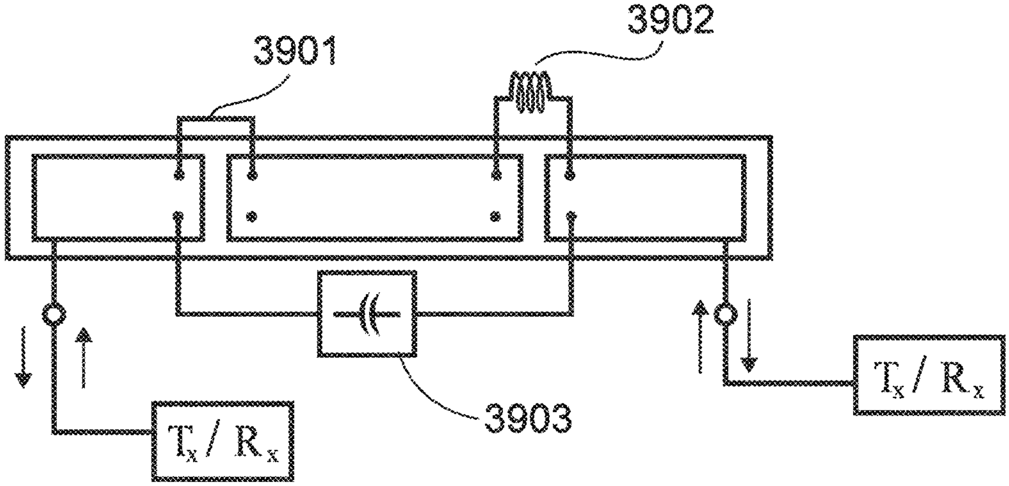
FIG. 39 shows a two ports MIMO solution containing an antenna component configured for operating at mobile bands from LTE700 to LTE2600, the MIMO solution including an isolation bridge that contains a smart tuner.
Figure 40:
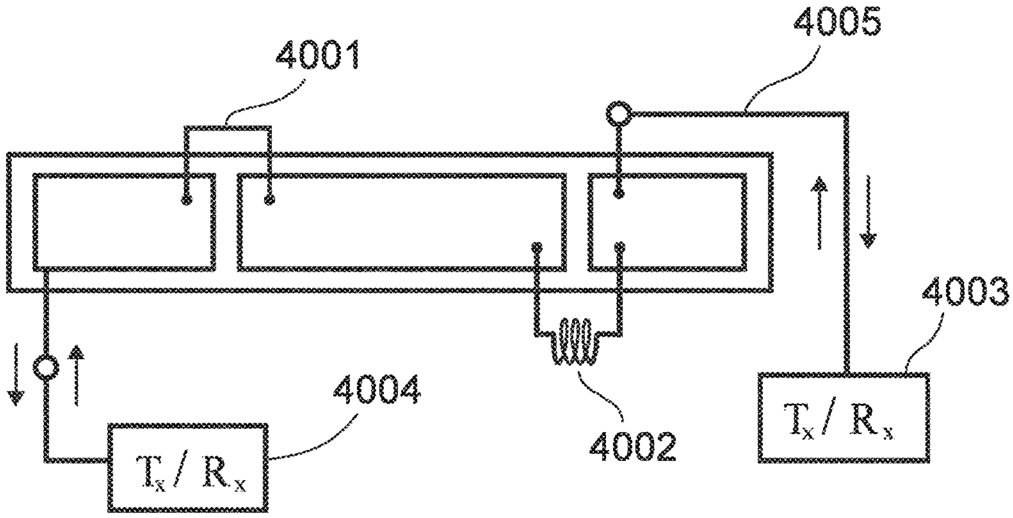
FIG. 40 provides another MIMO solution comprising an antenna component configured differently from the one provided in FIG. 39, including a simpler isolation bridge, than the embodiment provided in FIG. 33, for also operating at mobile bands from LTE700 to LTE2600.

The following embodiments, shown in FIG. 39 and FIG. 40, provide a three-sections antenna component comprised in a modular antenna system included in a wireless device that provides simultaneous operation in a same frequency range or ranges at two different ports, so operating as a MIMO device. Different antenna system configurations comprising at least one isolation bridge are provided with the different embodiments that comprise the same antenna component. Both embodiments are configured for covering mobile communications ranging from LTE700 to LTE2600 (698 MHz to 2690 MHz frequency range) at both ports. The embodiment shown in FIG. 39 includes two connections 3901, a short-circuit, and 3902, an inductance, between the different successive conductive elements included in the different sections, together with an additional isolation bridge 3903 between first and last sections, the isolation bridge comprising a smart tuner able to tune the isolation frequencies to a sought band within the operation frequencies of the antenna system. As mentioned before, another possible system configuration of the MIMO embodiment operating at mobile communications covering from LTE700 to LTE2600 is provided in FIG. 40. The successive sections comprised in the antenna component included in the embodiment are also connected between them, as illustrated with elements 4001, a short-circuit, and 4002. The isolation bridge 4002 in this case does not include a smart tuner, but it is a passive inductor component that blocks some frequencies depending on the inductor value. An additional feature related to this particular embodiment is that port 4003 is connected to the antenna component on the opposite side to port 4004 connection side, as illustrated with the connection element 4005.

What is claimed is:

1. A multi-section antenna component fabricated in a single piece, comprising:

a first section including a radiation booster; and a second section including at least one of: a radiating element or a plurality of radiation boosters, wherein:

the first and second sections are separated by a gap and are aligned along a first direction;

the multi-section antenna component has a maximum size greater than 1/30 times a free-space wavelength corresponding to a lowest frequency of operation of the multi-section antenna component, the maximum size being smaller than 1/5 times the free-space wavelength; and a thickness of the multi-section antenna component is within the range 1/60 and 1/45000 times the free-space wavelength.

2. The multi-section antenna component of claim 1, further comprising a third section, the first, second, and third sections being separated by gaps, wherein the third section is arranged in a non-linear manner with respect to the first and second sections.

3. The multi-section antenna component of claim 2, wherein the gaps between the first, second, and third sections are the same.

4. The multi-section antenna component of claim 2, wherein the gap between the first and second sections is different from the gap between the second and third sections.

5. The multi-section antenna component of claim 1, further comprising a third section, the first, second, and third sections being separated by gaps, wherein the first, second, and third sections are arranged in a matrix layout.

6. The multi-section antenna component of claim 5, wherein the gaps between the first, second, and third sections are the same.

7. The multi-section antenna component of claim 5, wherein the gap between the first and second sections is different from the gap between the second and third sections.

8. The multi-section antenna component of claim 1, wherein the first and second sections are mounted on a dielectric support and each include at least one conductive element arranged on a two-dimensional shape.

9. The multi-section antenna component of claim 8, wherein the dielectric support includes a dielectric substrate and at least one of the first and second sections includes a volumetric conductive element.

10. The multi-section antenna component of claim 9, wherein the volumetric conductive element includes two flat conductive elements arranged in different layers of the dielectric substrate, the conductive elements being connected by a connector.

11. The multi-section antenna component of claim 10, wherein the connector is a via on a printed circuit board.

12. The multi-section antenna component of claim 10, wherein the gap between the first and second sections is between 0.5 and 4 mm, and the conductive elements have a rectangular or squared shape.

13. A wireless electronic device including a multi-section antenna component of claim 1, comprising:

a radiating system operating in one or more frequency regions;

a ground plane included in the radiating system; and a matching network.

14. The wireless electronic device of claim 13, wherein the first and second sections are connected by an external circuit.

15. The wireless electronic device of claim 14, wherein the external circuit comprises an element selected from the group consisting of: electronic components, passive or active components, or transmission lines, or filters, and conductive traces or strips.

16. The wireless electronic device of claim 13, wherein the wireless electronic device operates in two or more frequency regions including two or more different frequency bands corresponding to two or more communication standards.

17. The wireless electronic device of claim 16, wherein the first and second sections are connected by an external circuit.

18. The wireless electronic device of claim 17, wherein the external circuit comprises an element selected from the group consisting of: electronic components, passive or active components, or transmission lines, or filters, and conductive traces or strips.

19. The wireless electronic device of claim 16, wherein the two or more communication standards are selected from the group consisting of: GNSS, cellular communication standards, WiFi, and Bluetooth.

20. The wireless electronic device of claim 19, wherein the first and second sections are connected by an external circuit.

* * * * *